(12) United States Patent
Lebrun et al.

(10) Patent No.: US 10,953,597 B2
(45) Date of Patent: Mar. 23, 2021

(54) METHOD OF FORMING A THREE-DIMENSIONAL BODY

(71) Applicant: SAINT-GOBAIN PERFORMANCE PLASTICS CORPORATION, Solon, OH (US)

(72) Inventors: Jean-Marie Lebrun, Marlborough, MA (US); Helen K. Bergstrom, Somerville, MA (US); Qiaoxi Li, Marlborough, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 154 days.

(21) Appl. No.: 16/041,410

(22) Filed: Jul. 20, 2018

(65) Prior Publication Data

US 2019/0039290 A1     Feb. 7, 2019

Related U.S. Application Data

(60) Provisional application No. 62/535,521, filed on Jul. 21, 2017.

(51) Int. Cl.
| | |
|---|---|
| *B29C 64/165* | (2017.01) |
| *B29C 33/44* | (2006.01) |
| *B33Y 70/00* | (2020.01) |
| *B33Y 10/00* | (2015.01) |
| *B29C 64/124* | (2017.01) |

(Continued)

(52) U.S. Cl.
CPC ............ *B29C 64/165* (2017.08); *B29C 33/44* (2013.01); *B29C 64/124* (2017.08); *B29C 71/02* (2013.01); *B33Y 10/00* (2014.12); *B33Y 70/00* (2014.12); *B29C 2035/0827* (2013.01);
(Continued)

(58) Field of Classification Search
None
See application file for complete search history.

(56) References Cited

U.S. PATENT DOCUMENTS

| | | | |
|---|---|---|---|
| 4,233,421 A | 11/1980 | Worm | |
| 4,912,171 A | 3/1990 | Grootaert et al. | |

(Continued)

FOREIGN PATENT DOCUMENTS

| | | |
|---|---|---|
| CN | 101213070 B | 6/2012 |
| CN | 103302860 A | 9/2013 |

(Continued)

OTHER PUBLICATIONS

Michelle Griffith et al., Scattering of ultraviolet radiation in turbid suspensions, Journal of Applied Physics, 1997, pp. 2538-2546, vol. 81, No. 6.

(Continued)

*Primary Examiner* — Cachet I Proctor
(74) *Attorney, Agent, or Firm* — Abel Schillinger, LLP; Chi Suk Kim

(57) ABSTRACT

A method of forming a three-dimensional body from a mixture, wherein the mixture can comprise dispersed solid polymeric particles and a curable binder. In a particular embodiment the solid polymeric particles can be fluoropolymeric particles. The method can include at least partial removal of the cured binder and sintering, to obtain a sintered polymeric three-dimensional body. In one embodiment, the sintered three-dimensional body can be PTFE.

22 Claims, 15 Drawing Sheets

(51) Int. Cl.
  *B29C 71/02* (2006.01)
  *B29K 27/18* (2006.01)
  *B29C 35/08* (2006.01)

(52) U.S. Cl.
  CPC .......... *B29C 2035/0833* (2013.01); *B29C 2035/0838* (2013.01); *B29K 2027/18* (2013.01); *B29K 2995/0077* (2013.01)

(56) References Cited

U.S. PATENT DOCUMENTS

| | | | |
|---|---|---|---|
| 5,247,180 | A | 9/1993 | Mitcham et al. |
| 5,391,072 | A | 2/1995 | Lawton et al. |
| 5,474,719 | A | 12/1995 | Fan et al. |
| 5,545,367 | A * | 8/1996 | Bae ................... B33Y 50/02 264/401 |
| 5,980,813 | A | 11/1999 | Narang et al. |
| 6,027,326 | A | 2/2000 | Cesarano, III et al. |
| 6,117,612 | A | 9/2000 | Halloran et al. |
| 6,401,795 | B1 | 5/2002 | Cesarano, III et al. |
| 7,052,263 | B2 | 5/2006 | John |
| 7,158,849 | B2 | 1/2007 | Huang et al. |
| 7,438,846 | B2 | 10/2008 | John |
| 7,514,477 | B2 | 4/2009 | Klare et al. |
| 7,569,273 | B2 | 8/2009 | Bredt et al. |
| 7,636,610 | B2 | 12/2009 | Schillen et al. |
| 7,815,835 | B2 | 10/2010 | Stampfl et al. |
| 7,892,474 | B2 | 2/2011 | Shkolnik et al. |
| 7,927,538 | B2 | 4/2011 | Moszner et al. |
| 8,022,155 | B2 | 9/2011 | Liska et al. |
| 8,057,731 | B2 | 11/2011 | Abe |
| 8,178,012 | B1 | 5/2012 | Khan et al. |
| 8,326,024 | B2 | 12/2012 | Shkolnik et al. |
| 8,666,142 | B2 | 3/2014 | Shkolnik et al. |
| 8,741,203 | B2 | 6/2014 | Liska et al. |
| 8,845,316 | B2 | 9/2014 | Schillen et al. |
| 8,974,717 | B2 | 3/2015 | Maguire et al. |
| 8,999,323 | B2 | 4/2015 | Liska et al. |
| 9,102,576 | B1 * | 8/2015 | Spowart ................. C06B 43/00 |
| 9,205,601 | B2 | 12/2015 | DeSimone et al. |
| 2002/0161120 | A1 * | 10/2002 | Chapman ................ C08L 77/00 525/165 |
| 2003/0076041 | A1 | 4/2003 | Honda et al. |
| 2005/0003189 | A1 * | 1/2005 | Bredt ..................... C08L 101/00 428/402 |
| 2005/0248061 | A1 * | 11/2005 | Shkolnik ................ B33Y 40/00 264/401 |
| 2005/0259785 | A1 | 11/2005 | Zhang |
| 2008/0036117 | A1 | 2/2008 | Hickerson et al. |
| 2009/0130449 | A1 | 5/2009 | El-Siblani |
| 2010/0003619 | A1 | 1/2010 | Das et al. |
| 2010/0283188 | A1 | 11/2010 | Rohner et al. |
| 2012/0010066 | A1 | 1/2012 | Fischer et al. |
| 2012/0245024 | A1 | 9/2012 | Chaput et al. |
| 2012/0310365 | A1 | 12/2012 | Chaput et al. |
| 2013/0249146 | A1 | 9/2013 | Zenere et al. |
| 2013/0292862 | A1 | 11/2013 | Joyce |
| 2013/0304233 | A1 | 11/2013 | Dean et al. |
| 2014/0163717 | A1 | 6/2014 | Das et al. |
| 2014/0227382 | A1 | 8/2014 | Liska et al. |
| 2014/0308624 | A1 | 10/2014 | Lee et al. |
| 2014/0361463 | A1 * | 12/2014 | DeSimone .............. B33Y 10/00 264/401 |
| 2015/0071809 | A1 | 3/2015 | Nordkvist et al. |
| 2015/0072293 | A1 * | 3/2015 | DeSimone .............. B33Y 50/02 430/322 |
| 2015/0097315 | A1 * | 4/2015 | DeSimone .............. B29C 64/129 264/401 |
| 2015/0097316 | A1 | 4/2015 | DeSimone et al. |
| 2015/0102532 | A1 | 4/2015 | DeSimone et al. |
| 2015/0131074 | A1 | 5/2015 | Ebert et al. |
| 2015/0258732 | A1 | 9/2015 | Stampfl et al. |
| 2016/0263838 | A1 | 9/2016 | Goldman et al. |
| 2016/0325493 | A1 * | 11/2016 | DeSimone ................ B22C 9/02 |
| 2016/0332386 | A1 | 11/2016 | Kuijpers |
| 2016/0376460 | A1 | 12/2016 | Fukushi et al. |
| 2017/0260347 | A1 | 9/2017 | Lee et al. |
| 2018/0290380 | A1 * | 10/2018 | Rehrig ................ C04B 35/6264 |

FOREIGN PATENT DOCUMENTS

| | | | |
|---|---|---|---|
| CN | 103980690 | A | 8/2014 |
| CN | 104015363 | A | 9/2014 |
| CN | 104085106 | A | 10/2014 |
| CN | 104093547 | A | 10/2014 |
| CN | 104619478 | A | 5/2015 |
| CN | 104842565 | A | 8/2015 |
| DE | 29911122 | U1 | 9/1999 |
| DE | 102017203885 | A1 | 9/2017 |
| ES | 2424738 | T3 | 10/2013 |
| FR | 2990860 | A1 | 11/2013 |
| JP | 2010259804 | A | 11/2010 |
| JP | 2012056323 | A | 3/2012 |
| JP | 5480907 | B2 | 4/2014 |
| JP | 5571917 | B2 | 8/2014 |
| KR | 101407048 | B1 | 6/2014 |
| WO | 1998006560 | A1 | 2/1998 |
| WO | 2000042471 | A1 | 7/2000 |
| WO | 2001072501 | A1 | 10/2001 |
| WO | 2008005327 | A2 | 1/2008 |
| WO | 2011098609 | A1 | 8/2011 |
| WO | 2012024675 | A2 | 2/2012 |
| WO | 2012053895 | A1 | 4/2012 |
| WO | 2012129968 | A1 | 10/2012 |
| WO | 2013093612 | A1 | 6/2013 |
| WO | 2014126834 | A2 | 8/2014 |
| WO | 2014126837 | A2 | 8/2014 |
| WO | 2015080888 | A2 | 6/2015 |
| WO | 2015142546 | A1 | 9/2015 |
| WO | 2016007495 | A1 | 1/2016 |
| WO | 2017014784 | A1 | 1/2017 |
| WO | 2017059866 | A2 | 4/2017 |
| WO | 2017066584 | A1 | 4/2017 |
| WO | WO-2017066584 | A1 * | 4/2017 ........... B29C 64/129 |
| WO | 2017127561 | A1 | 7/2017 |
| WO | 2017127569 | A1 | 7/2017 |
| WO | 2017127572 | A1 | 7/2017 |
| WO | 2017192859 | A2 | 11/2017 |

OTHER PUBLICATIONS

Y. Abouliatim et al., "Optical characterization of stereolithography," Journal of the European Ceramic Society, 2009, pp. 919-924, vol. 29, Iss. 5.

K. Wu et al., "Prediction of ceramic stereolithography resin sensitivity from theory and measurement of diffusive photon transport," Journal of Applied Physics, 2005, pp. 024902-1-024902-10, vol. 98.

Vladislava Tomeckova et al., "Critical energy for photopolymerization of ceramic suspensions in acrylate monomers," Journal of the American Ceramic Society, 2010, pp. 3273-3282, vol. 30.

International Search Report and Written Opinion for PCT/US2017/031077, dated Jul. 24, 2017, 14 pages.

Gregory Smith et al., "Magnetically-responsive electrophoretic silica organosols," Journal of Colloid and Interface Science, 2014, pp. 252-255, vol. 426.

Scott Grunewald, "The Carima C-CAT DLP 3D Printer Can Print at a Blistering 1cm per minute," 3dprint.com, 2015, 3 pages.

M. Riccardis, "Ceramic Coatings Obtained by Electrophoretic Deposition: Fundamentals, Models, Post-Deposition Processes and Applications," Ceramic Coatings—Applications in Engineering, 2012, pp. 43-68, InTech.

"Our Process," nexa3d.com, accessed Apr. 13, 2016, 3 pages. https://nexa3d.com/process/.

"Electrophoretic deposition," wikipedia.org, last edited Sep. 5, 2018, 5 pages. https://en.wikipedia.org/wiki/Electrophoretic_deposition.

"E Ink," wikipedia.org, last edited Dec. 10, 2018, 7 pages. https://en.wikipedia.org/wiki/E_Ink.

Honsberg et al., "Photovoltaics: Devices, Systems and Applications," 1998, PVCDROM, The University of New South Wales.

(56) References Cited

OTHER PUBLICATIONS

Vincent, "Basic Elasticity and Viscoelasticity," Structural Biomaterials, 2008, pp. 1-28, Princeton University Press.
Alec last name unknown, "3M makes non-stick PTFR polymers 3D printable through new patent-pending tech," 3ders. org, 2016, 3 pages.
"Polyflon PTFR D-610C Technical Information," Daikin, 2015, 1 page.
"PTFE D-610C Technical Data Sheet," Daikin, 2016, 1 page.
"Ciba® IRGACURE® 819," Ciba Specialty Chemicals—Coating Effects Segment, 2001, 3 pages.
Rachel Gordon, "Will PTFR be the next 3D printable material?" idtechex.com, 2016, 3 pages.
"PTFE D-210C Dispersion Technical Data Sheet," Daikin, 2016, 1 page.
Daikin Polyflon™ PTFE Products—Product Information Guide for Aqueous Dispersions, Fine Powders, Granular Molding Powders, 2016, 8 pages, Daikin America, Inc.
Christophe Chaput, "Ceramic 3D printing technology to meet most complex specifications," 3D Ceram Advanced Ceramics, 17 pages.
Michiel de Brujicker, "ADMATEC Additive Manufacturing Technologies," 2015, 26 pages.
Jaco Saurwalt et al., "ADMATEC Additive Manufacturing Technologies—Additive Manufacturing of Ceramics," 2014, 27 pages.
Nahum Travitzky et al., "Additive Manufacturing of Ceramic-Based Materials," Advanced Engineering Materials, 2014, pp. 729-754, vol. 16, No. 6.
"Ceramic Suspension Rheology," Fundamentals of Ceramic Powder Processing and Synthesis, 1996, p. 559.
"Carbon3D introduces breakthrough CLIP technology for layerless 3D printing, 25-100x faster," 3Ders.org, 2015, 3 pages.
Simon last name unknown, "Chinese company Prismlab unveils super-fast SLA 3D printer, can print 2,712 cm3 in just 1 hour," 3Ders.org, 2015, 5 pages.
Alec last name unknown, New Gizmo 3D's super-fast DLP 3D printer creates objects in 6 minutes, 3Ders.org, 2015, 8 pages.
Michael Molitch-Hou, "Autodesk Pours $10 Million into Carbon3D's ultra-fast 3D printing technology," 3dprintingindustry.com, 2015, 5 pages.
Davide Sher, "Bo Pang's Continuous DLP Technology Is Taking Ultra Fast 3D Printing to the Masses," 3dprintingindustry.com, 2015, 4 pages.
Andrew Wheeler, "Breakthrough! Layerless 3D Printing! 25-100x Faster Prints!" 3dprintingindustry.com, 2015, 5 pages.
Michelle L. Griffith et al., "Freeform Fabrication of Ceramics via Stereolithography," Journal of the American Ceramic Society., 1996, pp. 2601-2608, vol. 79, No. 10.
J. Deckers et al., "Additive Manufacturing of Ceramics: A Review," Journal of Ceramic Science and Technology, 2014, pp. 245-260, vol. 5, No. 4.
Zak C. Eckel et al., "Additive manufacturing of polymer-derived ceramics," Science Magazine, 2016, pp. 58-62, vol. 351, No. 6268.
Xiaoyu Zheng et al., "Ultralight, Ultrastiff Mechanical Metamaterials," Science Magazine, 2014, pp. 1373-1377, vol. 344, No. 6190.
John R. Tumbleston et al., "Supplementary Materials—Continuous liquid interface production of 3D objects," Science Magazine, 2015, 13 pgs, vol. 347.
John R. Tumbleston et al., "Continuous liquid interface production of 3D objects," Science Magazine, 2015, 7 pgs, vol. 347.
"Printing Ceramic Parts Using the New Ceramaker 3D Printer," DKG, 2014, p. E13, No. 8.
Johannes Homa, "Additive manufacturing of high-performance ceramics," lithoz.com, 2015, 17 pages.

International Search Report and Written Opinion for PCT/US2016/057061, dated Dec. 29, 2016, 15 pages.
T. Chartier et al., "Additive Manufacturing to Produce Complex 3D Ceramic Parts," Journal of Ceramic Science and Technology, 2015, pp. 95-104, vol. 6, No. 02.
Christophe Chaput et al., "Fabrication of ceramics by stereolithography," Rtejournal, 16 pages.
International Search Report and Written Opinion for PCT/US2018/043122, dated Oct. 31, 2018, 16 pages.
Maciej Wozniak et al., "Highly loaded UV curable nanosilica dispersions for rapid prototyping applications," Journal of the European Ceramic Society, 2009, pp. 2259-2265, vol. 29, Iss. 11.
Yayue Pan et al., "Fast Recoating Methods for the Projection-based Stereolithography Process in Micro- and Macro-scales," Comput. Des., 2015, pp. 846-872.
W. Zhou et al., "Direct fabrication of an integral ceramic mould by stereolithography," Proc. IMechE, 2009, pp. 237-243, vol. 224, Part B: J. Engineering.
C. Hinczewski et al., "Ceramic suspensions suitable for stereolithography," Journal of the European Ceramic Society, 1998, pp. 583-590, vol. 18, Iss. 6.
Maciej Wozniak et al., "Rheology of UV curable colloidal silica dispersions for rapid prototyping applications," 2011, pp. 2221-2229, vol. 31, Iss. 13.
Johannes Homa et al., "A Novel Additive Manufacturing Technology for High-Performance Ceramics," Advanced Processing and Manufacturing Technologies for Nanostructured and Multifunctional Materials, 2015, pp. 153-162.
Gerald Mitteramskogler et al., "Light curing strategies for lithography-based additive manufacturing of customized ceramics," Additive Manufacturing, 2014, pp. 110-118.
Chang-Jun Bae et al., "Influence of Residual Monomer on Cracking in Ceramics Fabricated by Stereolithography," International Journal of Applied Ceramic Technology, 2011, pp. 1289-1295, vol. 8, Iss. 6.
Howard Barnes, "A Review of the Rheology of Filled Viscoelastic Systems," Rheology Reviews, 2003, pp. 1-36, The British Society of Rheology.
Howard Barnes, "An appreciation and critique of the suspension rheology research," Appl. Rheol., 2000, pp. 248-253, vol. 10, Iss. 5.
S. Mueller et al., "The rheology of suspensions of solid particles," Proceedings of the Royal Society, 2009, pp. 1201-1228, vol. 466.
Sundaram Gunasekaran et al., "Dynamic oscillatory shear testing of foods—selected applications," Trends in Food Science & Technology, 2000, pp. 115-127, vol. 11.
Hongmei Liao, "Stereolithography Using Compositions Containing Ceramic Powders," 1997, thesis submitted to University of Toronto.
Vladislava Tomeckova et al., "Predictive models for the photopolymerization of ceramic suspensions," Journal of the European Ceramic Society, 2010, pp. 2833-2840, vol. 30. Iss. 14.
Vladislava Tomeckova et al., "Cure depth for photopolymerization of ceramic suspensions," Journal of the European Ceramic Society, 2010, pp. 3023-3033, vol. 30.
Rajeev Garg et al., "Absorption length for photon propagation in highly dense colloidal dispersions," Journal of Materials Research, 1998, pp. 3463-3467, vol. 13, No. 12.
Jeffrey Eldridge et al., "Determination of Scattering and Absorption Coefficients for Plasma-Sprayed Yttria-Stabilized Zirconia Thermal Barrier Coatings at Elevated Temperatures," 2009, Journal of the American Ceramic Society, pp. 2276-2285, vol. 92, Iss. 10.
R. Zallen et al., "The optical absorption edge of brookite $TiO_2$," Solid State Communications, 2006, pp. 154-157, vol. 137.
Herbert Philipp, "Optical Properties of Silicon Nitride," Journal of the Electrochemical Society, 1973, pp. 295-300, vol. 120, Iss. 2.
Lyle Patrick et al., "Optical Absorption in n-Type Cubic SiC," Physical Review Journals, 1969, pp. 775-777, vol. 186, Iss. 3.

* cited by examiner

After Forming

Dried & Sintered

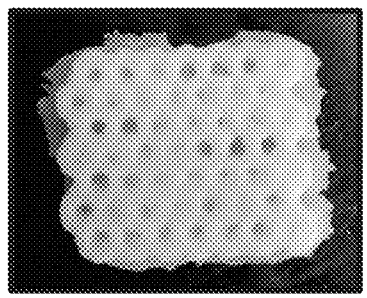 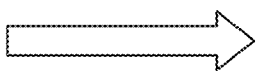 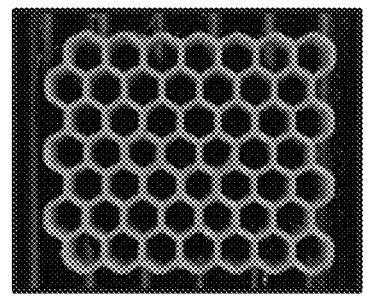
FIG. 7A  FIG. 7B

METHOD OF FORMING A THREE-DIMENSIONAL BODY

CROSS-REFERENCE TO RELATED APPLICATION

This application claims priority under 35 U.S.C. § 119(e) to U.S. Provisional Application No. 62/535,521, entitled "METHOD OF FORMING A THREE-DIMENSIONAL BODY," by Jean-Marie Lebrun et al., filed Jul. 21, 2017, which is assigned to the current assignee hereof and is incorporated herein by reference in its entirety.

FIELD OF THE DISCLOSURE

The present disclosure relates to a method of forming a three-dimensional body from a mixture comprising dispersed solid polymeric particles, and particularly the forming of a three-dimensional body from a mixture comprising solid fluoropolymeric particles.

BACKGROUND

The manufacturing of polymeric three-dimensional bodies based on a layer by layer built up of a radiation curable liquid material has become of increasing interest, especially in view of the enhancement in production speed if a bottom-up technique is employed. One disadvantage of three-dimensional printing is the limited spectrum of curable resins that can be used and the limited material type of formed polymeric bodies. It is desirable to expand the scope of polymer materials that may be formed during 3D printing to a broader spectrum of polymers, such as particularly fluoropolymers, for example, polytetrafluoroethylene (PTFE).

SUMMARY

According to one embodiment, a method of forming a three-dimensional body, comprising: providing a mixture comprising a curable binder and dispersed solid polymeric particles; and forming a three-dimensional body from the mixture by curing the binder, wherein forming includes translation and growth of the three-dimensional body from an interface of the mixture, and the solid polymeric particles have a higher thermal transition temperature than the decomposition temperature of the cured binder.

According to another embodiment, a method of forming a three-dimensional body comprises providing a mixture comprising a curable binder and dispersed solid particles, the solid particles including a fluoropolymer; and forming a three-dimensional body from the mixture by curing the binder, wherein forming includes translation and growth of the three-dimensional body from an interface of the mixture.

BRIEF DESCRIPTION OF THE DRAWINGS

The present disclosure may be better understood, and its numerous features and advantages made apparent to those skilled in the art by referencing the accompanying drawings.

FIG. 7B includes an image of a formed FEP comprising body after drying, which was formed in the presence of a dye according to one embodiment.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, the term mixture refers to a fluid of a certain viscosity, including a liquid component and solid particles. The liquid component may include a curable binder and a solvent.

As used herein, the term solid polymeric particles refers to polymeric particles that remain solid in the mixture and do not dissolve in the liquid component of the mixture during forming of the three-dimensional body. In a particular embodiment, the solid polymeric particles include a fluoropolymer.

Various embodiments of the present disclosure will now be described, by way of example only, with reference to the accompanying drawings.

The present disclosure relates to a method of forming a three-dimensional body from an interface of a mixture including dispersed solid polymeric particles and a curable binder. The method can include removal of at least a portion of the cured binder from the formed body wherein the shape of the body can be maintained.

Figure 1:
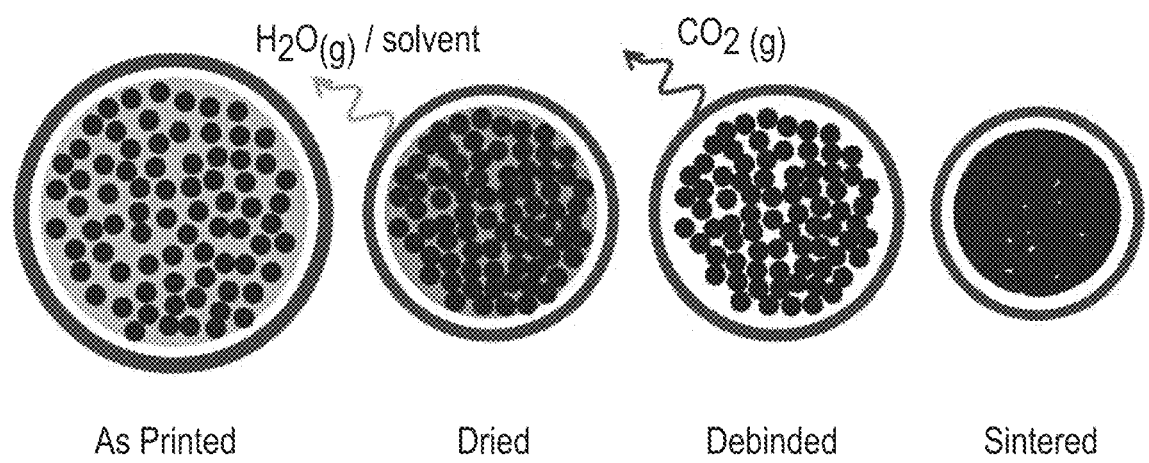
FIG. 1 includes a scheme of the process of forming a sintered three-dimensional polymeric body according to one embodiment.

According to one embodiment, the method may include the following steps: 1) providing a mixture comprising dispersed solid polymeric particles and a curable binder; 2) forming a three-dimensional body from an interface of the mixture; 3) drying the formed three-dimensional body at elevated temperatures to remove solvent present in the formed body; 4) removing at least a portion of the cured binder by heating the three-dimensional body to a decomposition temperature of the binder; and 5) sintering the three-dimensional body close to a thermal transition temperature of the solid polymeric particles to form a sintered three-dimensional body. A simplified scheme of the process is illustrated in FIG. 1.

In one embodiment, the mixture can be prepared by using a dispersion of solid polymeric particles in a solvent, and mixing the dispersion together with the curable binder. In one aspect, the binder may be at least partially soluble in the solvent.

Figure 2A:
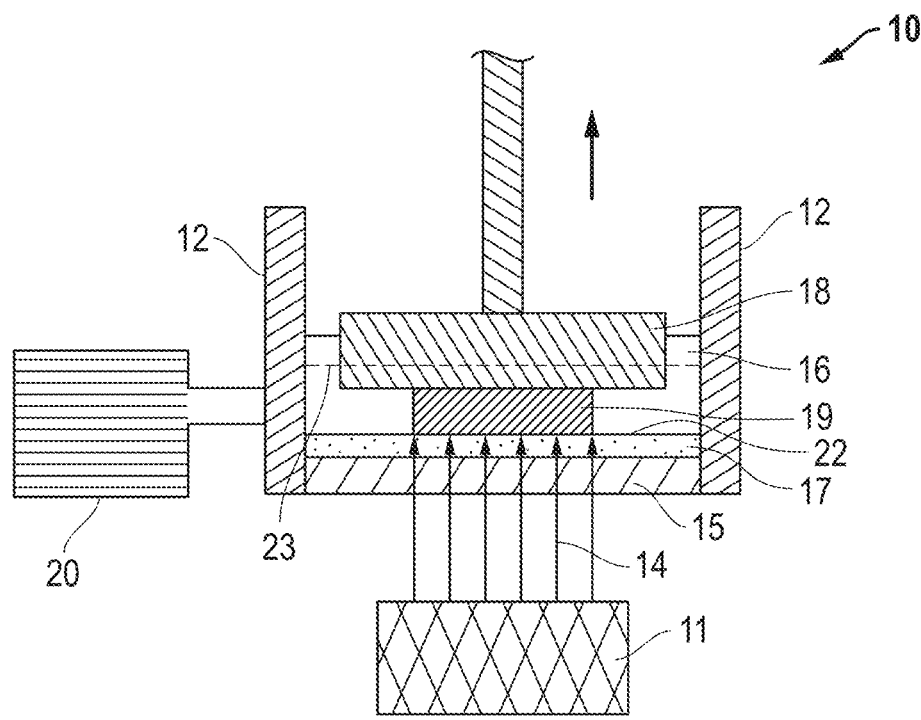
FIG. 2A includes an illustration of an assembly according to one embodiment, showing the starting phase of forming of a three-dimensional body.

The forming of the three-dimensional body can be conducted in an assembly, as illustrated in FIG. 2A. The assembly can have a computer controlled electromagnetic radiation unit (11), a chamber (12), and a construction unit (13). The electromagnetic radiation unit (11) can be configured to deliver electromagnetic radiation to a portion of the mixture, wherein the electromagnetic radiation can have a particular wavelength, including for example an ultraviolet radiation (UV) or visible light. The assembly can include a radiation source (14), for example, a laser or a light emitting diode (LED), which can be configured to project a varying computer-aided design/computer-aided manufacturing (CAD/CAM) created two-dimensional image onto a transparent window (15) at the bottom of the chamber (12). The chamber (12) can include a mixture (16) that can include a radiation curable material and solid particles. The transparent window (15) of the chamber (12) can be semipermeable for a particular inhibitor, which may be a gaseous material. In such instances, the semipermeable layer is selectively permeable, such that it is configured to allow for the transfer of the inhibitor into the mixture, but may not allow transfer of other materials (e.g., water) through the transparent window (15). The transparent window (15) may include an additional semipermeable layer (not shown) for the penetration of an inhibitor, for example air or oxygen, into the mixture (16) of the chamber (12). During the forming process, the inhibitor may enter the chamber (12) by permeating the transparent window (15) and form an inhibition zone (17) at a bottom region of the mixture (16). In the inhibition zone (17) the inhibitor can limit or prevent curing of the mixture (16) by the electromagnetic radiation.

According to one embodiment, a carrier plate (18) can be positioned above the chamber (12). The position between the carrier plate (18) and the mixture in the chamber (12) can be changed during the forming process to facilitate formation of the three-dimensional body. When the formation of the three-dimensional body is started, the carrier plate (18) can be emerged into the mixture (16) up to a pre-calculated distance from the interface of the inhibition zone (22). According to one embodiment, the pre-calculated distance corresponds to a portion of the mixture that can be radiation cured (translated from liquid to solid state) if subjected to electromagnetic radiation from the radiation unit (11) underneath the chamber (12), and is further on called "translating portion" (19). The radiation cured translating portion (19) can be adhered to the carrier plate (18) and can be vertically moved away from the interface of the inhibition zone (22). Concurrently with the upwards movements of the carrier plate (18) and the attached solidified translating portion (19), mixture (16) from the sides of the polymerization chamber or from a reservoir (20) can fill the released space. The construction is designed to move the carrier plate (18) continuously upwards in vertical direction (i.e., Z-direction) at a speed that corresponds to the time needed for radiation curing mixture (16) that replaces the upwards moved solidified translating portion.

Figure 2B:
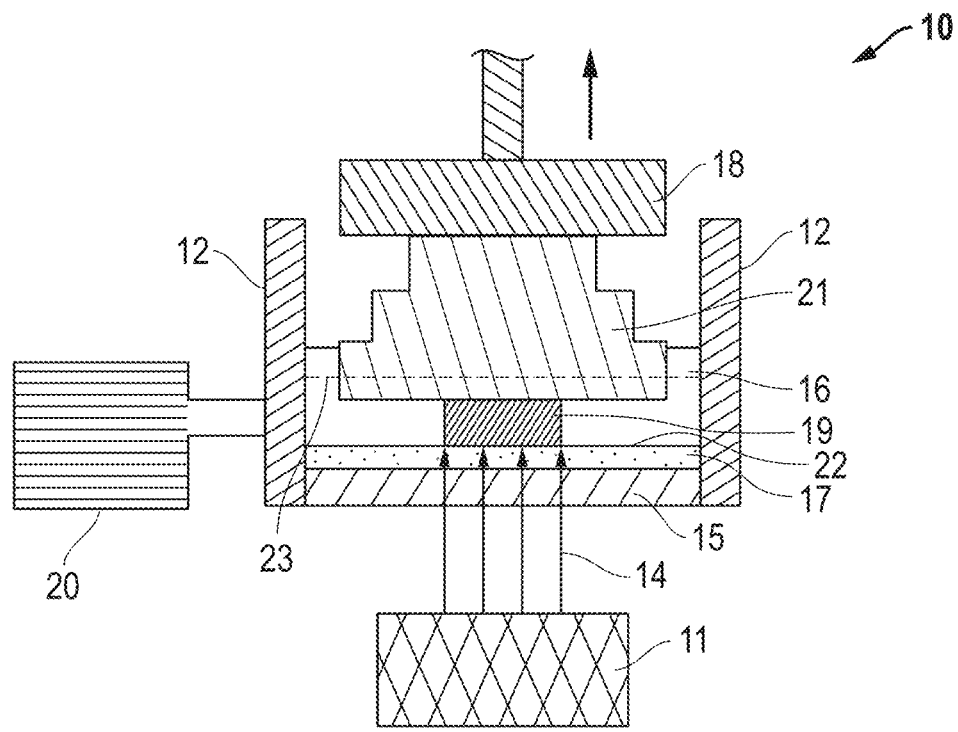
FIG. 2B includes an illustration of an assembly according to one embodiment, showing a later phase of forming of a three-dimensional body.

FIG. 2B includes an illustration of a partially formed three-dimensional body according to an embodiment. The partially formed body includes three solidified and unified translating portions (21) and one translating portion (19) which is subjected to radiation curing.

The increase in distance between the carrier plate (18) and the mixture (16) when forming the three-dimensional body can be caused by moving either the carrier plate (18) or the chamber (12) or both carrier plate (18) and chamber (12) in relation to each other.

The carrier plate (18) of the assembly may be configured for continuous movement to facilitate formation of the three-dimensional body as the carrier plate (18) is moved.

The inhibition zone (17) is a zone of the mixture, which is only distinguished from the other part of the mixture by the presence of an inhibitor in a concentration that the mixture may not cure if exposed to electromagnetic radiation. Actual solidification and forming of the three-dimensional body starts at the interface of the inhibition zone (22). The interface of the inhibition zone (22) can also be considered as an interface of the mixture from where the forming of the three-dimensional body starts.

In order to assure curing of the mixture throughout a thickness of the translating portion (19), the cure depth (23) can be controlled that it reaches a larger distance through the mixture in Z-direction from the transparent window (15) than the thickness of the translating portion (19). In one embodiment, the cure depth (23) may reach at least 25% further than the thickness of the translating portion (19), such as at least 30%, at least 35%, or at least 40%.

In one embodiment, the thickness of the translating portion (19) can be at least 1 µm, such as at least 3 µm, at least 5 µm, such as at least 10 µm, at least 15 µm, at least 20 µm, at least 30 µm, or at least 50 µm. In another embodiment, the thickness of the translating portion may be not greater than 700 µm, such as not greater than 600 µm, not greater than 500 µm, not greater than 450 µm, or not greater than 400 µm. Thickness of the translating portion can be a value between any of the maximum and minimum values note above, such as from 1 µm to 700 µm, from 10 µm to 650 µm, from 50 µm to 350 µm, or from 5 µm to 50 µm.

The formation of the three-dimensional body may not necessarily be considered a layer-by-layer forming process. Instead, the forming process (e.g., curing) may be in the form of a gradient of solidification (e.g., polymerization).

As used in the context of the present disclosure, continuous translation and growth of the three-dimensional body means that the carrier plate (18) can be moved in a continuous manner or in discrete steps with short stops between each step. In certain instances, the continuous translation and growth will be characterized by a gradient of solidification that is maintained while forming the three-dimensional body. A gradient of solidification means that a continuous polymerization reaction is maintained across the thickness of the translating portion (19), with the lowest degree of solidification next to the interface of the inhibition zone (22) and the greatest degree of solidification at the opposite end across the thickness of the translating portion (19). The three-dimensional body formed by the process of continuous translation can thereby possess a non-layered internal structure, such that in a crosscut along the z-axis, changes in the morphology of the three-dimensional body are not visible to the naked eye.

In those embodiments utilizing short stops in the movement of the carrier plate (18), such stops are generally brief and suitable for maintaining the above-described gradient of solidification. According to one embodiment, the stops can be for a duration of at least 1 microsecond, such as at least 300 microseconds, at least 500 microseconds, at least 800 microseconds or even at least 1000 microseconds. In other embodiments, the stops may be for a duration of not longer that 1 second, such as not longer than 0.5 seconds, not longer than 0.3 seconds or not longer than 0.2 seconds or even not longer than 0.1 seconds. It will be appreciated that the stops can have a duration within a range including any of the minimum and maximum values note above, such as from 1 microsecond to 1 second or from 300 microseconds to 0.5 seconds or from 1000 microseconds to 0.1 seconds.

In further embodiments, the method of the present disclosure can also include longer stops during the forming of the three-dimensional body, such that the gradient of solidification may be interrupted and the translation is not continuous as defined above. Such longer stops may be desired for the making of a body having defined regions which are cleavable.

The inhibition zone (17) can be a part of the mixture and located next to the transparent window (15) of the chamber, where the mixture does not cure or only to a very limited extend under electromagnetic radiation. Accordingly, the inhibition zone (17) may facilitate limited or no adhesion of the radiation cured material to the bottom of the chamber (12), which may facilitate simpler release of the body from the chamber after forming is completed.

The inhibition zone (17) can be formed when the inhibitor enters the chamber (12) through the transparent and semipermeable window (15), and may be regulated in its thickness by the concentration of the inhibitor.

In one embodiment, the thickness of the inhibition zone (17) can be varied by varying the intensity of the applied electromagnetic radiation.

In another embodiment, the thickness of the inhibition zone (17) can be varied by varying the pressure of a gaseous inhibitor for forming the inhibition zone.

In one embodiment, the thickness of the inhibition zone may be at least 0.5 µm, such as at least 1.0 µm, at least 2.0 µm, or at least 5 µm. In another embodiment, the inhibition zone may not be greater than 600 µm, such as not greater than 500 µm, not greater than 300 µm, or not greater than 100 µm. It will be appreciated that the thickness of the inhibition zone can be a value between any of the maximum and minimum values noted above, such as from 0.5 µm to 600 µm, from 1.0 µm to 450 µm, or from 3 µm to 200 µm.

The inhibitor may preferably be an oxygen containing gas, such as air, mixtures of an inert gas and oxygen, or pure oxygen. In another aspect, when oxygen cannot inhibit the activity of the photoinitiator (for example, when a cationic photoinitiator is used) the inhibitor can be an amine, e.g., ammonia, ethyl amine, di and trialkyl amines, carbon dioxide, or combinations thereof.

In one embodiment, the inhibitor can be pure oxygen, and the oxygen may penetrate the semipermeable layer in an amount of at least 0.1 Barrer, such as at least 1 Barrer, at least 5 Barrer, at least 10 Barrer, or at least 30 Barrer.

Although the term "inhibition zone" appears to indicate that no polymerization reaction may take place in that area of the mixture, it will be appreciated that polymerization reactions can also occur to a limited extent in the inhibition zone (17). The inhibition zone (17) may be also described as a gradient of polymerization, where with increasing distance from the bottom surface of the chamber larger amounts of polymerization reactions can happen, but these polymerization reactions may not completely cure the mixture, and the mixture is still maintained in a liquid stage. The interface of the inhibition zone (22) may be understood as the area of the inhibition zone (17) where the polymerization reactions start to form a solid material.

Varying the thickness of the translating portion (19) can include adjusting the position of the carrier plate (18) onto which the three-dimensional body is attached relative to the interface of the inhibition zone (22).

The binder of the mixture can be a radiation curable binder. During forming of the body, the mixture can be subjected to electromagnetic radiation having a wavelength in a range from 200 nm to 760 nm and thereby curing the radiated binder. In a preferred aspect, the range of the electromagnetic radiation may be from 370 nm to 450 nm, or from 380 nm to 410 nm.

In embodiments, the electromagnetic radiation can be created by a laser, a light emitting diode (led), or by electron beam radiation.

In one embodiment, the electromagnetic radiation applied for curing the binder can have an energy of at least 1 mJ/cm$^2$, such as at least 5 mJ/cm$^2$, at least 10 mJ/cm$^2$, at least 20 mJ/cm$^2$, at least 30 mJ/cm$^2$, at least 50 mJ/cm$^2$ or at least 80 mJ/cm$^2$. In another embodiment, the electromagnetic radiation can have an energy not greater than 450 mJ/cm$^2$, such as not greater than 400 mJ/cm$^2$, not greater than 350 mJ/cm$^2$, not greater than 300 mJ/cm$^2$, not greater than 250 mJ/cm$^2$, not greater than 200 mJ/cm$^2$, or not greater than 100 mJ/cm$^2$. It will be appreciated that the electromagnetic radiation energy can be a value between any of the maximum and minimum values noted above, such as from 1 mJ/cm$^2$ to 450 mJ/cm$^2$, from 50 mJ/cm$^2$ to 300 mJ/cm$^2$, from 40 mJ/cm$^2$ to 200 mJ/cm$^2$, or from 20 mL/cm$^2$ to 100 mJ/cm$^2$.

In a particular embodiment, the method of the present disclosure may cure the binder in the translating portion (19) during continuous forming of the three dimensional body at a UV power of at least 0.1 mW/cm$^2$, such as at least 0.5 mW/cm$^2$, at least 1.0 mW/cm$^2$, or at least 3.0 mW/cm$^2$. In another particular embodiment, the applied UV power during forming may be not greater than 250 mW/cm$^2$, such as not greater than 150 mW/cm$^2$, not greater than 100 mW/cm$^2$, not greater than 50 mW/cm$^2$, not greater than 30 mW/cm$^2$, not greater than 20 mW/cm$^2$, not greater than 13.0 mW/cm$^2$, not greater than 12 mW/cm$^2$, or not greater than 10 mW/cm$^2$. It will be appreciated that the applied UV power can be a value between any of the maximum and minimum values noted above, such as from 0.1 mW/cm$^2$ to 250.0 mW/cm$^2$, from 1.0 mW/cm$^2$ to 100 mW/cm$^2$ or from 2.0 mW/cm$^2$ to 10 mW/cm$^2$.

The electromagnetic radiation (14) can cure the binder in the mixture (16) up to a certain distance throughout the mixture, hereinafter called the cure depth (23). The cure depth (23) may be affected by the size, type, and concentration of the solid polymeric particles and the refractive index of the particle slurry.

The method of the present disclosure can continuously manufacture a three-dimensional body at a high production speed. In one aspect, the creating of the three-dimensional body can be completed at a speed rate of at least 1 mm/hour, such as at least 5 mm/hour, at least 10 mm/hour, at least 20 mm/hour, at least 25 mm/hour, at least 40 mm/hour, at least 50 mm/hour, or at least 60 mm/hour. In another aspect, the forming speed may be not greater than 5000 mm/hour, such as not greater than 3000 mm/hour, not greater than 1000 mm/hour, not greater than 500 mm/hour, or not greater than 100 mm/hour. The forming speed can be a value between any of the maximum and minimum values noted above, such as from 1 mm/hour to 5000 mm/hour, from 5 mm/hour to 500 mm/hour, or from 10 mm/hour to 80 mm/hour.

Figure 9:
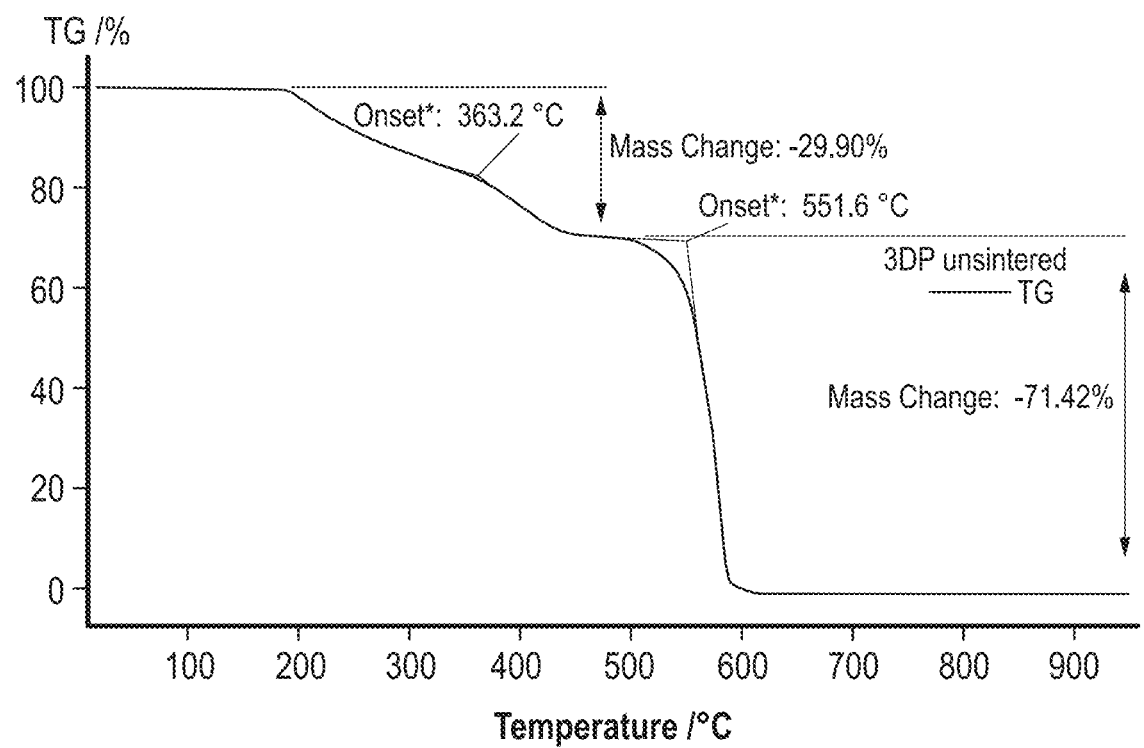
FIG. 9 includes a graph illustrating a thermogravimetric analysis (TGA) of a FEP comprising three-dimensional body according to one embodiment.
Figure 10:
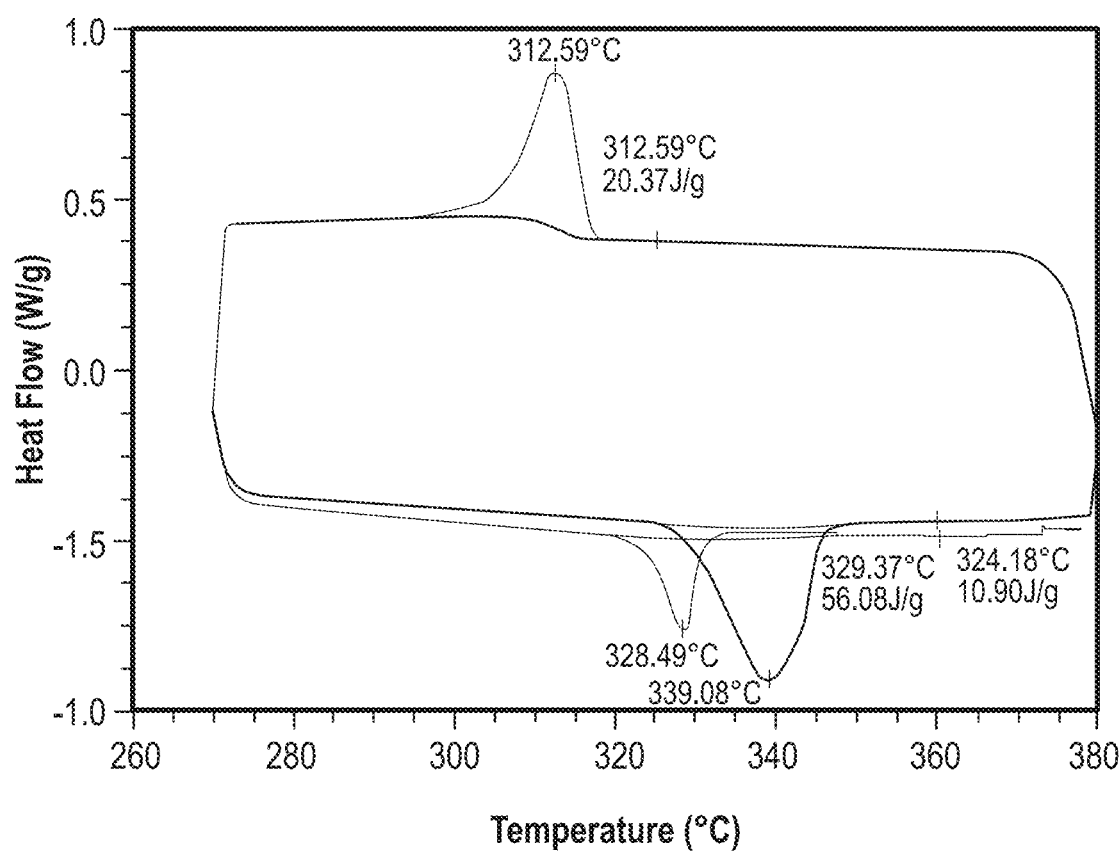
FIG. 10 includes a graph illustrating a differential scanning calorimetry (DSC) measurement for solid PTFE particles used as starting material for the forming of a three-dimensional body according to one embodiment.

The solid particles can be polymeric solid particles having a thermal transition temperature which is higher than the decomposition temperature of the cured binder. This can allow at least a partial removal of the cured polymeric binder by maintaining the shape of the three-dimensional body, wherein the solid polymeric particles form a percolated network. As used herein, the thermal transition temperature of the solid polymeric particles relates to the temperature at which the polymeric particles start melting or start to undergo a glass transition like stage. The thermal transition temperature can be determined by Differential Scanning calorimetry (DSC) or Differential Thermal Analysis (DTA). FIG. 10 illustrates an example of a DSC measurement for solid PTFE particles, showing an onset (i.e., start) of the melting point of the PTFE particles at 329° C. Furthermore, as used herein, the decomposition temperature of the binder relates to the temperature at which 5 wt % of the binder based on the total weight of the binder is decomposed into volatile compounds and removed from the body. The decomposition temperature of a binder can be determined, for example, from a Thermal Graphimetric Analysis (TGA) graph, as illustrated in FIG. 9, and further explained in the examples.

In a certain embodiment, the solid polymeric particles can be fluoropolymers. Non-limiting examples of fluoropolymers can be polytetrafluoroethylene (PTFE), tetrafluoroethylene-hexafluoropropylene (FEP), perfluoroalkoxyethylene (PFA), ethylene-tetrafluoroethylene (ETFE), polyvinylidone fluoride (PVDF), ethylene-chlorotrifluoroethylene (ECTFE), perfluoromethyl vinyl ether (MFA), or any combination thereof. In a particular embodiment, the material of the solid particles can be PTFE. In another particular embodiment, the material of the solid particles can be PFA. In yet a further particular embodiment, the material of the solid particles can be FEP.

The solid particles of the present disclosure may not be limited to fluoropolymers. Other suitable solid polymeric particles can be thermoplastics or thermosets having a high thermal transition temperature, for example, polyimide (PI), polyetheretherketone (PEEK), polyamide-imide (PAI), poly (etherketon-etherketonketon) (PEKEKK), or polyethylene imine (PEI).

In embodiments, the polymeric solid particles can have a thermal transition temperature of at least 240° C., such as at least 250° C., at least 260° C., at least 300° C., at least 310° C., or at least 320° C. In other embodiments, the thermal transition temperature of the solid particles may be not greater than 380° C., such as not greater than 360° C., not greater than 340° C., or not greater than 330° C. The thermal transition temperature of the solid particles can be a value between any of the maximum and minimum values noted above, such as from 240° C. to 360° C., from 260° to 340° C., or from 280° C. to 330° C.

The solid particles contained in the mixture can have an average primary particle size of at least 0.06 µm, such as at least 0.070 µm, at least 0.080 µm, at least 0.1 µm, at least 0.150 µm, at least 0.2 µm, at least 0.23 µm, or at least 0.260 µm. In another aspect, the solid particles can have an average primary particle size of not greater than 10 µm, such as not greater than 8 µm, not greater than 5 µm, or not greater than 1 µm. The average primary size of the solid particles can be a value between any of the minimum and maximum values noted above, such as from 0.06 µm to 1 µm, from 0.07 µm to 5 µm, or from 0.1 µm to 5 µm. As used herein, the average primary particle size of the solid polymeric particles relates to the average particles size in single form, not including particle agglomerates.

In a certain embodiment, the solid polymeric particles dispersed in the mixture can form solid polymeric particle aggregates. In one aspect, the solid particles aggregates can have an average particle size of not greater than 50 µm, such as not greater than 35 µm, not greater than 20 µm, or not greater than 15 µm.

In a further embodiment, the solid polymeric particles can have a molecular weight of at least $1\times10^5$ g/mol, such as at least $5\times10^5$ g/mol, at least $1\times10^6$ g/mol, at least $5\times10^6$ g/mol, or at least $1\times10^7$ g/mol. In another embodiment, the molecular weight of the solid polymeric particles may be not greater than $9\times10^7$ g/mol, such as not greater than $6\times10^7$ g/mol, or not greater than $3\times10^7$ g/mol. The molecular weight of the solid polymeric particles can be a value between any of the maximum and minimum values noted above, such as from $1\times10^5$ g/mol to than $9\times10^7$ g/mol, from $1\times10^6$ g/mol to $6\times10^7$ g/mol, or from $1\times10^7$ g/mol to $9\times10^7$ g/mol.

In yet a further embodiment, the solid polymeric particles in the mixture, before forming of a three-dimensional body and sintering of the body, can have a crystallinity of at least 65%, such as at least 70%, at least 80%, or at least 90%.

A solid polymeric particle, as used herein, maintains solid in the mixture during preparing of the mixture and forming of the three-dimensional body and can include at least 30 wt % of polymers based on the total weight of the particle, such as at least 40 wt %, at least 50 wt %, at least 60 wt %, at least 70 wt %, at least 80 wt %, at least 90 wt %, at least 95 wt %, or at least 99 wt % polymer based on the total weight of the solid particle. Other components in the solid polymeric particle may be inorganic or organic compounds. In a particular embodiment, the solid polymeric particles of the present disclosure may consist essentially of a fluoropolymer including only unavoidable impurities.

The amount of the solid particles contained in the mixture can be in a range that a percolated network be formed, and that the created three-dimensional body can be densified without falling apart upon burnout of the binder. In one embodiment, the amount of the solid particles can be at least 10 vol %, such as at least 15 vol %, at least 20 vol %, at least 25 vol %, or at least 30 vol % based on the total volume of the mixture. In another embodiment, the particle content can be not greater than 70 vol %, such as not greater than 65 vol %, not greater than 60 vol %, not greater than 55 vol %, or not greater than 50 vol %. It will be appreciated that the amount of solid particles can be a value between any of the maximum and minimum values noted above, such as from 10 vol % to 70 vol %, from 15 vol % to 60 vol %, or from 20 vol % to 45 vol % based on the total volume of the mixture.

In a certain embodiment, the mixture can be prepared by using as starting material a dispersion of the solid particles. In one aspect, the dispersion may include solid polymeric particles, a solvent, and a surfactant. The solid polymeric particles may not dissolved in the solvent of the dispersion and maintain solid. Suitable solvents of the dispersion can be water, ethanol, acetone, dimethyl sulphoxide (DMSO), dimethylformamide (DMF), tetrahydrofuran (THF), methyl-ethylketone, ethyl acetate, methylene chloride, N-methyl-2-pyrrolidone (NMP), a fluor-solvent, or any combination thereof.

In one embodiment, the solvent can be a component of the mixture exceeding the amount of the binder and/or the solid particles. In aspects, an amount of the solvent can be at least 10 wt % based on a total weight of the mixture, such as at least 15 wt %, at least 20 wt %, at least 25 wt %, at least 30 wt %, or at least 35 wt %. In another aspect, the amount of the solvent can be not greater than 65 wt % based on a total weight of the mixture, such as not greater than 60 wt %, not greater than 55 wt %, not greater than 50 wt %, not greater than 45 wt %, or not greater than 40 wt %. The amount of solvent in the mixture can be a value between any of the maximum and minimum numbers noted above, such as from 10 wt % to 65 wt %, from 15 wt % to 55 wt %, or from 20 wt % to 50 wt %.

In a certain embodiment, it is desirable that the curable binder is at least partially soluble in the solvent contained in the mixture. The curable binder of the mixture of the present disclosure can comprise polymerizable monomers and/or polymerizable oligomers. Non-limiting examples of polymerizable monomers and oligomers can be: an acrylate, an acrylamide, an urethane, a diene, a sorbate, a sorbide, a carboxylic acid ester, or any combination thereof. In a particular embodiment, the curable binder can include a water-soluble difunctional acrylic monomer. In another particular embodiment, the curable binder can be a combination of a water-soluble difunctional acrylic monomer and a water-insoluble polyester acrylate oligomer. Further examples of acrylate binder can be 1,4,-butanediol diacrylate or 1,6-hexanediol diacrylate.

In an embodiment, an amount of the curable binder can be at least 1 wt % based on a total weight of the mixture, such as at least 2 wt %, at least 3 wt %, or at least 5 wt %. In other embodiments, the binder may be present in an amount not greater than 25 wt % based on a total weight of the mixture, such as not greater than 20 wt %, not greater than 18 wt %, not greater than than 15 wt %, not greater than 10 wt %, or not greater than 8 wt %. The amount of the curable binder in the mixture can be a value between any of the maximum and minimum values noted above, such as from 1 wt % to 25 wt %, from 5 wt % to 20 wt %, or from 10 wt % to 17 wt % based on a total weight of the mixture.

In order to keep the solid particles well dispersed in the mixture, one or more surfactants can be added to the mixture. If a dispersion of solid particles is used as starting material, the surfactant contained in the dispersion may be sufficient to keep the solid particles dispersed in the final mixture. The surfactant can be a non-ionic surfactant, an anionic surfactant, a cationic surfactant, or any combination thereof. In certain embodiments, the surfactant can be a fatty acid ester, a fluorosurfactant, or a combination thereof.

In one embodiment, the surfactant contained in the mixture can be present in an amount of at least 0.05 wt %, such as at least 0.1 wt %, at least 0.5 wt %, at least 1 wt % or at least 2 wt % based on the total weight of the of the mixture. In another embodiment, the amount of surfactant may be not greater than 15 wt %, such as not greater than 10 wt %, not greater than 7 wt %, or not greater than 5 wt % based on a total weight of the mixture. The amount of surfactant can be a value between any of the maximum and minimum values noted above, such as from 0.05 wt % to 15 wt %, from 0.5 wt % to 10 wt % or from, or from 1 wt % to 5 wt %.

The mixture can further include a photoinitiator. The photoinitiator can be a free-radical photoinitiator. In a particular aspect, a free-radical photoinitiator can be employed, which can be inhibited by the presence of oxygen. Non-limiting examples of free-radical photoinitiators can include ketones or phosphine oxides, such as IRGACURE™ 819 (bis(2,4,6-trimethylbenzoyl)-phenylphosphineoxide), ESSTECH TPO (2,4,6-trimethylbenzoyl)-phenylphosphineoxide) or a combination thereof.

In an embodiment where a cationic photoinitiator is used, the photopolymerization generally tends to be slower and cannot be inhibited by oxygen. In this aspect, instead of oxygen as inhibitor, a Bronsted acid or Lewis acid, such as metal halides and their organometallic derivatives can be employed and released from the bottom window of the polymerization chamber to form an inhibition zone.

According to another embodiment of the present disclosure, the mixture may further include a dye. The dye can function as an additional inhibitor by absorbing excess radiation energy and may improve the resolution of the formed three-dimensional body. In one embodiment, the dye can be a fluorescent dye. The fluorescent dye can be selected from the classes of rhodamine dyes, fluorine dyes, acridine dyes, cyanine dyes, phenanthrine dyes, or acridine dyes. In one aspect, the dye can be a rhodamine, for example, Rhodamine B, Rhodamine 6G, Rhodamine 123, or a rhodamine derivative, e.g., Rhodamine B isothiocyanate. In a particular aspect, the dye may be Rhodamine B. In another aspect, the dye can be a fluorone dye, for example Fluorescein. Other suitable examples of dyes, but not limited thereto, can be IR-780 perchlorate (1,1',3,3,3',3'-4,4',5,5'-dibenzo-2,2'-indotricarbocyanine perchlorate), Crystal Violet, or a combination thereof.

The suitability of a dye with regard to the resolution and the strength of the formed body can vary largely. For example, it has been observed that Rhodamine B can be advantageous for improving the resolution of a printed body with no detrimental influence on the strength of the body, while Fluorescin may improve the resolution of a formed body under certain conditions but can be of disadvantage regarding a desired strength of the body.

The amount of dye in the mixture for forming a three dimensional body having an improved resolution of the formed body in comparison to not using a dye can depend on several factors, for example, the amount of solid polymeric particles in the mixture, the thickness of the inhibition zone, the radiation intensity during forming, the forming speed, the amount of photoinitiator, or a combination thereof. In one embodiment the dye may be present in an amount of at least 0.01 wt % based on the total weight of the mixture, such as at least 0.025 wt %, or at least 0.03 wt %, or at least 0.05 wt %, or at least 0.075 wt % based on the total weight of the mixture. In another embodiment, the amount of dye in the mixture may be not greater than 1 wt %, such as not greater than 0.5 wt %, or not greater than 0.2 wt %, or not greater than 0.1 wt %. The amount of dye in the mixture can be a value between any of the maximum and minimum values noted above, such as from 0.01 wt % to 1 wt %, from 0.03 wt % to 0.5 wt %, or from 0.05 wt % to 0.1 wt % based on the total weight of the dye. In a particular embodiment, the dye can be Rhodamine B in an amount of at least 0.01 wt % to not greater than 0.2 wt %.

The mixture of the present disclosure can further include one or more additives. Non-limiting examples of additives can be plasticizers, dispersing agents, debinding accelerators, cross-linking monomers, pH regulators, a pharmaceutically active ingredient, a defoamer, a processing aid, or any combination thereof.

The rheological properties of the mixture containing solid particles and a radiation curable material may be controlled to facilitate suitable formation of a stable and suitably formed three-dimensional body, including for example, a polymeric three-dimensional body having sufficient strength to be self-supporting and capable of handling without detrimental deformation. Also, the force required to continuously pull-up the carrier the force utilized to pull the carrier plate away from the chamber may be adjusted based on various parameters, including but not limited to the rheology of the mixture.

In a further aspect, the mixture may have a low shear viscosity to prevent particle settling over the duration of the forming of the three-dimensional body. Furthermore, the solid polymeric particles contained in the slurry may be uniformly dispersed throughout the radiation curable material when electromagnetic radiation is conducted such that the three-dimensional body can shrink uniformly during sintering. Non-uniform distribution of the solid polymeric particles may result in forming of undesirable macro-structural or micro-structural features, including for example, undesirable porosity and the like. Under low shear rate may be understood a range of not greater about 5 Hz and at least about 0.1 Hz, with a corresponding viscosities from at least about 50 cP to not greater than about 100000 cP.

In one embodiment, the mixture may be formed such that the content of agglomerates of the solid particles is limited. In a certain embodiment, the mixture can be essentially free of agglomerates of solid polymeric particles.

In one aspect, the yield point of the mixture may be less than 10 Pa, such as less than 8 Pa, less than 5 Pa, or less than 3 Pa at room temperature.

After forming of the three-dimensional body, the body can be subjected to drying for removing the solvent from the formed body. Drying can be conducted at an elevated temperature and/or under applied vacuum. In one embodiment, the drying temperature can be close to the boiling temperature of the solvent being removed from the body, but should not exceed the boiling point of the solvent by more than 20° C. In a certain aspect, the solvent contained in the three-dimensional body can be water, and the body can be dried at a temperature not greater than 120° C., such as not greater than 115° C., not greater than 110° C., or not greater than 105° C.

In one embodiment, the three-dimensional body may shrink during drying. The shrinkage of the three-dimensional body after drying, based on the size of the body before drying, can be at least 1%, such as at least 3%, at least 5%, or at least 7%. In another embodiment, the shrinkage after drying can be not greater than 30%, such as not greater than 25%, not greater than 20%, not greater than 15%, or not greater than 10%, based on the total size of the body before drying. The shrinkage can be a value between any of the minimum and maximum values note above, such as from 1% to 30%, from 5% to 20%, or from 10% to 15%. As used herein, the shrinkage in any of the three dimensions (x, y, z) is calculated according to equation $$s = \left| \ln\left(\frac{l_f}{l_0}\right) \right|,$$

where $l_0$ and $l_f$ are respectively the initial and final dimensions of the object measured with a caliper.

After drying, the three-dimensional body can be subjected to further heating to remove the cured binder by decomposition to volatile compounds. In a certain embodiment, the decomposition temperature of the binder can be at least 150° C., such as at least 180° C., at least 190° C., or at least 200° C. In another embodiment, the temperature for decomposing the binder may be not greater than 300° C., such as not greater than 280° C., or not greater than 250° C. The temperature for decomposing the binder can be a value between any of the minimum and maximum values noted above, such as from 150° C. to 300° C., from 190° C. to 270° C., or from 200° C. to 280° C.

In one embodiment, the cured binder can be decomposed during heat treatment such that a weight loss of the binder in the body can be at least 10 wt % based on the total weight of the cured binder, such as at least 20 wt %, at least 30 wt %, at least 40 wt %, at least 50 wt %, at least 70 wt %, at least 80 wt %, at least 90 wt %, at least 95 wt %, at least 98 wt %, at least 99 wt %, or at least 99.95 wt %.

In one aspect, the temperature during the binder removal can be increased above a decomposition temperature of the binder, but below the thermal transition temperature of the solid polymeric particles contained in the body. In another aspect, complete binder removal may be obtained above the sintering temperature.

Following the removal or partial removal of the cured binder, the three-dimensional body can be subjected to high temperature sintering. During high temperature sintering, the solid polymeric particles of the body can coalesce to form a more densified body by lowering the surface energy.

In one embodiment, the sintering temperature may be not less than 60° C. below a thermal transition temperature of the solid particles, such as not less than 50° C., not less than 30° C., not less than 20° C., not less than 15° C., not less than 10° C., or not less than 5° C.

In another embodiment, the sintering temperature can be not less than 5° C. below the decomposition temperature of the solid polymeric particles, such as not less than 10° C., not less than 15° C., not less than 20° C., not less than 50° C., or not less than 100° C. below the decomposition temperature of the solid particles.

After high temperature sintering, the bulk density of the sintered three-dimensional body can be at least 0.2 g/cm³, such as at least 0.5 g/cm³, at least 1.0 g·cm³, at least 1.5 g/cm³, at least 1.8 g/cm³, at least 1.9 g/cm³, at least 2.0 g/cm³, at least 2.05 g·cm³, or at least 2.1 g/cm³.

In further embodiments, the sintered three-dimensional body can have a crystallinity of at least 10%, such as at least 13%, at least 20%, or at least 30%.

The formed fluoropolymeric bodies of the present disclosure can have desired strength properties. In one embodiment, a formed fluoropolymeric body after high temperature sintering can have a tensile strength at maximum load of at least 5 MPa, such as at least 10 MPa, at least 12 MPa, at least 14 MPa, at least 16 MPa, or at least 18 MPa, or at least 20 MPa. In another aspect, the tensile strength at maximum load may be not greater than not greater than 35 MPa, such as not greater than 30 MPa, not greater than 25 MPa, or not greater than 22 MPa. The tensile stress at maximum load may be a value between any of the minimum and maximum values noted above.

The sintered three-dimensional body of the method of the present disclosure can further have an elongation of break at a temperature of 25° C. of at least 50%, such as at least 70%, at least 90%, at least 100%, at least 110%, at least 150%, such as at least 160%, at least 170%, at least 180%, at least 190%, or at least 200%. In another embodiment, the elongation of break can be not greater than 1000%, such as not greater than 800%, not greater than 600%, not greater than 400%, not greater than 350%, not greater than 330%, or not greater than 300%. The elongation of break at a temperature of 25° C. can be a value between any of the minimum and maximum values note above.

In a further embodiment, the sintered three-dimensional body can have a relative density of at least 40%, such as at least 50%, at least 60%, or at least 70%, at least 80%, at least 90%, or at least 95% with respect to a fluoropolymeric material having a density of 2.2 g/cm³.

The process of the present invention can form sintered three-dimensional polymeric bodies from solid polymeric particles which are already fully polymerized in the uncured mixture and possess a high melting temperature, wherein the melting temperature is higher than the decomposition temperature of the cured binder. Especially suitable polymeric particles can be fluoropolymer particles because of their high melting temperature.

In a particular embodiment, the sintered three-dimensional body can consist essentially of PTFE particles. As used herein, consisting essentially of PTFE particles is intended to mean that the sintered body includes at least 90 wt % PTFE, such as at least 95 wt %, or at least 99 wt % based on the total weight of the sintered body. The process of the present disclosure allows a unique way of producing complex three-dimensional PTFE bodies which cannot be made by other known techniques or require much higher production efforts. It is known that PTFE, unlike other thermoplastics, is not melt-flow processable, which means it does not flow when heated above its melting point. Accordingly, PTFE cannot be injection molded, which makes it very difficult to produce complex conventional shapes with PTFE that can be easily produced with other polymers.

The method of the present disclosure can form three dimensional bodies comprising fluoropolymeric particles, which may have after sintering a high size resolution. In one embodiment, the size resolution of the sintered body can be not greater than 300 microns, such as not greater than 280 microns, not greater than 260 microns, not greater than 240 microns, not greater than 220 microns, not greater than 200 microns, or not greater than 190 microns. As used herein, the term size resolution means that the process is capable of forming a three-dimensional body having an isolated body feature of a height of 1 mm and a thickness of not greater than 300 microns, such as not greater than 280 microns, not greater than 260 microns, not greater than 240 microns, not greater than 220 microns, not greater than 200 microns, or at not greater than 190 microns.

As further demonstrated in the Examples below, the method of the present disclosure can produce complex three-dimensional fluoropolymeric bodies with a high resolution in a continuous and fast forming process. The solid polymeric particles can be pre-selected in form of commercially available solid particle dispersions and integrated in a mixture comprising a curable binder.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A method of forming a three-dimensional body, comprising: providing a mixture comprising a curable binder and dispersed solid polymeric particles; and forming a three-dimensional body from the mixture by curing the binder to form a cured binder, wherein forming includes translation and growth of the three-dimensional body from an interface of the mixture, and the solid polymeric particles have a higher thermal transition temperature than a decomposition temperature of the cured binder.

Embodiment 2

A method of forming a three-dimensional body, comprising: providing a mixture comprising a curable binder and dispersed solid particles, the solid particles including a fluoropolymer; and forming a three-dimensional body from the mixture by curing the binder to form a cured binder, wherein forming includes translation and growth of the three-dimensional body from an interface of the mixture.

Embodiment 3

The method of Embodiments 1 or 2, wherein preparing the mixture includes combining a dispersion of the solid polymeric particles with the curable binder, wherein the dispersion includes a solvent, and at least a portion of the curable binder is soluble in the solvent.

Embodiment 4

The method of Embodiment 3, wherein the solvent is water.

Embodiment 5

The method of any of the preceding Embodiments, further comprising removing at least a portion of the cured binder from the formed three-dimensional body by a chemical treatment or a thermal treatment; followed by sintering to obtain a sintered three-dimensional body.

Embodiment 6

The method of Embodiment 5, wherein sintering is conducted at a sintering temperature not less than 60° C. below the thermal transition temperature of the solid particles, such as not less than 50° C., not less than 30° C., not less than 20° C., not less than 15° C., not less than 10° C., or not less than 5° C.

Embodiment 7

The method of Embodiment 5, wherein sintering is conducted at a sintering temperature not less than 5° C. below a decomposition temperature of the solid particles, such as not less than 10° C., not less than 15° C., or not less than 20° C.

Embodiment 8

The method of any of the preceding Embodiments, wherein the mixture further comprises a surfactant.

Embodiment 9

The method of Embodiment 8, wherein the surfactant includes a non-ionic surfactant, an anionic surfactant, a cationic surfactant, or any combination thereof.

Embodiment 10

The method of Embodiment 9, wherein the surfactant includes a fatty acid ester, a fluorosurfactant, or any combination thereof.

Embodiment 11

The method of any of the preceding Embodiments, wherein the mixture further includes a dye.

Embodiment 12

The method of Embodiment 11, wherein the dye comprises a fluorescent dye.

Embodiment 13

The method of Embodiment 12, wherein the fluorescent dye is selected from a rhodamine dye, a fluorone dye, a cyanine dye, an acridine dye, a cyanine dye, a phenanthridine dye, an oxazine dye, or any combination thereof.

Embodiment 14

The method of Embodiments 12 or 13, wherein the fluorescent dye comprises a rhodamine dye.

Embodiment 15

The method of Embodiments 13 or 14, wherein the rhodamine dye includes Rhodamine B.

Embodiment 16

The method of any of Embodiments 11 to 15, wherein an amount of the dye is at least 0.01 wt %, such as at least 0.025 wt %, or at least 0.05 wt % based on the total weight of the mixture.

Embodiment 17

The method of any of Embodiments 11 to 16, wherein an amount of the dye is not greater than 1 wt %, such as not greater than 0.5 wt %, not greater than 0.2 wt %, not greater than 0.15 wt %. or not greater than 0.1 wt % based on a total weight of the mixture.

Embodiment 18

The method of Embodiment 15, wherein the Rhodamine B is present in an amount of at least 0.01 wt % to not greater than 0.2 wt % based on a total weight of the mixture.

Embodiment 19

The method of any of the preceding Embodiments, wherein the mixture comprises at least 10 vol % of the solid particles based on a total volume of the mixture, such as at least 15 vol %, at least 20 vol %, at least 25 vol %, or at least 30 vol % based on a total volume of the mixture.

Embodiment 20

The method of any of the preceding Embodiments, wherein the mixture comprises not greater than 70 vol % of the solid particles based on a total volume of the mixture, such as not greater than 65 vol %, not greater than 60 vol %, not greater than 55 vol %, or not greater than 50 vol % based on a total volume of the mixture.

Embodiment 21

The method of any of the preceding Embodiments, wherein the solid particles have an average primary particle size of at least 60 nm, such as at least 70 nm, at least 80 nm, at least 100 nm, at least 150 nm, at least 200 nm, at least 230 nm, or at least 260 nm.

Embodiment 22

The method of any of the preceding Embodiments, wherein the solid particles have an average primary particle size not greater than 10 microns, such as not greater than 8 microns, not greater than 5 microns, or not greater than 1 micron.

Embodiment 23

The method of any of the preceding Embodiments, wherein the mixture includes solid polymeric particle aggregates formed from the solid polymeric particles, wherein a average particles size of the solid polymeric particle aggregates is not greater than 50 microns, such as not greater than 35 microns, not greater than 20 microns, or not greater than 15 microns.

Embodiment 24

The method of any of the preceding Embodiments, wherein the solid particles include polytetrafluoroethylene (PTFE), tetrafluoroethylene-hexafluoropropylene (FEP), perfluoroalkoxyethylene (PFA), ethylene-tetrafluoroethylene (ETFE), polyvinylidone fluoride (PVDF), ethylene-chlorotrifluoroethylene (ECTFE), perfluoromethyl vinyl ether (MFA), or any combination thereof.

Embodiment 25

The method of Embodiment 24, wherein the solid particles consist essentially of PTFE.

Embodiment 26

The method of any of the preceding Embodiments, wherein the thermal transition temperature of the solid polymeric particles is at least 300° C., such as at least 310° C., or at least 320° C.

Embodiment 27

The method of any of the preceding Embodiments, wherein the thermal transition temperature of the solid polymeric particles is not greater than 360° C., such as not greater than 340° C., or not greater than 330° C.

Embodiment 28

The method of any of the preceding Embodiments, wherein the solid particles have molecular weight of at least $1\times10^5$ g/mol, such as at least $5\times10^5$ g/mol, at least $1\times10^6$ g/mol, at least $5\times10^6$ g/mol, or at least $1\times10^7$ g/mol.

Embodiment 29

The method of any of the preceding Embodiments, wherein the solid particles have a molecular weight not greater than $9\times10^7$ g/mol, such as not greater than $6\times10^7$ g/mol, or not greater than $3\times10^7$ g/mol.

Embodiment 30

The method of any of the preceding Embodiments, wherein the solid particles have a crystallinity of at least 65%, such as at least 70%, at least 80%, or at least 90%.

Embodiment 31

The method of any of Embodiments 3 to 30, wherein an amount of the solvent in the mixture is at least 10 wt % based on a total weight of the mixture, such as at least 15 wt %, at least 20 wt %, at least 25 wt %, at least 30 wt %, or at least 35 wt %.

Embodiment 32

The method of any of Embodiments 3 to 31, wherein an amount of the solvent in the mixture is not greater than 65 wt % based on a total weight of the mixture, such as not greater than 60 wt %, not greater than 55 wt %, not greater than 50 wt %, not greater than 45 wt %, or not greater than 40 wt %.

Embodiment 33

The method of any of the preceding Embodiments, wherein the curable binder includes polymerizable monomers or polymerizable oligomers, the polymerizable monomers or polymerizable oligomers including an acrylate, an acrylamide, a urethane, a diene, a sorbate, a sorbide, a carboxylic acid esters, or any combination thereof.

Embodiment 34

The method of Embodiment 33, wherein the curable binder includes a difunctional acrylic monomer and a polyester acrylate oligomer.

Embodiment 35

The method of any of the preceding Embodiments, wherein an amount of the curable binder in the mixture is at least 1 wt % based on a total weight of the mixture, such as at least 2 wt %, at least 3 wt %, or at least 5 wt %.

Embodiment 36

The method of any of the preceding Embodiments, wherein an amount of the curable binder in the mixture is not greater than 20 wt % based on a total weight of the mixture, such as not greater than 15 wt %, not greater than 10 wt %, or not greater than 8 wt %.

Embodiment 37

The method of any of the preceding Embodiments, wherein the mixture further comprises a photoinitiator.

Embodiment 38

The method of Embodiment 37, wherein the photoinitiator is a free-radical photoinitiator.

Embodiment 39

The method of Embodiment 38, wherein the photoinitiator includes a peroxide, a ketone, a phosphine oxide, or any combination thereof.

Embodiment 40

The method of any of the preceding Embodiments, wherein forming is conducted at a forming speed of at least 1 mm/hour, such as at least 5 mm/hour, at least 10 mm/hour, at least 20 mm/hour, at least 25 mm/hour, at least 40 mm/hour, at least 50 mm/hour, or at least 60 mm/hour.

Embodiment 41

The method of any of the preceding Embodiments, wherein forming is conducted at a forming speed of not greater than 5000 mm/hour, such as not greater than 3000 mm/hour, not greater than 1000 mm/hour, not greater than 500 mm/hour, or not greater than 100 mm/hour.

Embodiment 42

The method of any of the preceding Embodiments, wherein curing includes radiating using an electromagnetic radiation within a wavelength range from at least 370 nm to not greater than 450 nm.

Embodiment 43

The method of Embodiment 42, wherein the electromagnetic radiation has an energy within a range from at least 5 mJ/cm² to not greater than 450 mJ/cm².

Embodiment 44

The method of any of the preceding Embodiments, wherein curing includes applying electromagnetic radiation to the mixture having an energy of at least 1 mJ/cm², such as at least 10 mJ/cm², at least 20 mJ/cm², at least 30 mJ/cm², at least 50 mJ/cm² or at least 80 mJ/cm².

Embodiment 45

The method of any of the preceding Embodiments, wherein curing includes applying electromagnetic radiation to the mixture having an energy not greater than 450 mJ/cm², such as not greater than 400 mJ/cm², not greater than 350 mJ/cm², not greater than 300 mJ/cm², not greater than 250 mJ/cm², not greater than 200 mJ/cm², or not greater than 100 mJ/cm².

Embodiment 46

The method of any of the preceding Embodiments, wherein curing includes applying electromagnetic radiation to the mixture having a power of at least 0.1 mW/cm², such as at least 0.5 mW/cm², at least 1.0 mW/cm², at least 2 mW/cm², or at least 3 mW/cm².

Embodiment 47

The method of any of the preceding Embodiments, wherein curing includes applying electromagnetic radiation to the mixture having a power not greater than 250 mW/cm², such as not greater than 100 mW/cm², not greater than 50 mW/cm², or not greater than 10 mW/cm².

Embodiment 48

The method of any of the preceding Embodiments, wherein the mixture has a viscosity at 25° C. of at least at least 10000 cP at a shear rate of less than about 5 Hz, and a viscosity of less than 50 cP at a shear rate greater than about 25 Hz.

Embodiment 49

The method of any of Embodiments 5 to 48, wherein the sintered three-dimensional body has a crystallinity of at least 10%, such as at least 13%, at least 20%, or at least 30%.

Embodiment 50

The method of any of Embodiments 5 to 48, wherein the sintered three-dimensional body has a bulk density of at least 0.2 g/cm3, such as at least 0.5 g/cm³, at least 1.0 g·cm3, at least 1.5 g/cm³, at least 1.8 g/cm³, at least 1.9 g/cm³, at least 2.0 g/cm³, at least 2.05 g·cm³, or at least 2.1 g/cm³.

Embodiment 51

The method of any of Embodiments 5 to 50, wherein the sintered three-dimensional body has a tensile strength at maximum load of at least 5 MPa, such as at least 10 MPa, at least 12 MPa, at least 14 MPa, at least 16 MPa, or at least 18 MPa.

Embodiment 52

The method of any of Embodiments 5 to 51, wherein the sintered three-dimensional body has a tensile strength at maximum load of not greater than 35 MPa, such as not greater than 30 MPa, not greater than 25 MPa, or not greater than 22 MPa.

Embodiment 53

The method of any of Embodiments 5 to 52, wherein the sintered three-dimensional body has an elongation of break of at least 50% at a temperature of 25° C., such as at least 70%, at least 90%, at least 100%, at least 110%, at least 150%, such as at least 160%, at least 170%, at least 180%, at least 190%, or at least 200%.

Embodiment 54

The method of any of Embodiments 5 to 53, wherein the sintered three-dimensional body has an elongation of break of not greater than 1000% at a temperature of 25° C., such as not greater than 800%, not greater than 600%, not greater than 400%, not greater than 350%, not greater than 330%, or not greater than 300%.

Embodiment 55

The method of any of Embodiments 5 to 54, wherein the sintered three-dimensional body has a relative density of at least 40%, such as at least 50%, at least 60%, at least 70%, at least 80%, at least 90%, or at least 95% with respect to a fluoropolymeric material having a density of 2.2 g/cm³.

Embodiment 56

The method of any of the preceding Embodiments, wherein forming of the body is conducted continuously.

Embodiment 57

The method of any of the preceding Embodiments, wherein the formed three-dimensional body has a size resolution of not greater than 300 microns, such as not greater than 280 microns, not greater than 260 microns, not greater than 240 microns, not greater than 220 microns, not greater than 200 microns, or not greater than 190 microns.

Embodiment 58

The method of Embodiment 57, wherein the size resolution is not greater than 220 microns.

EXAMPLES

The following non-limiting examples illustrate the present invention.

Example 1

Figure 3:
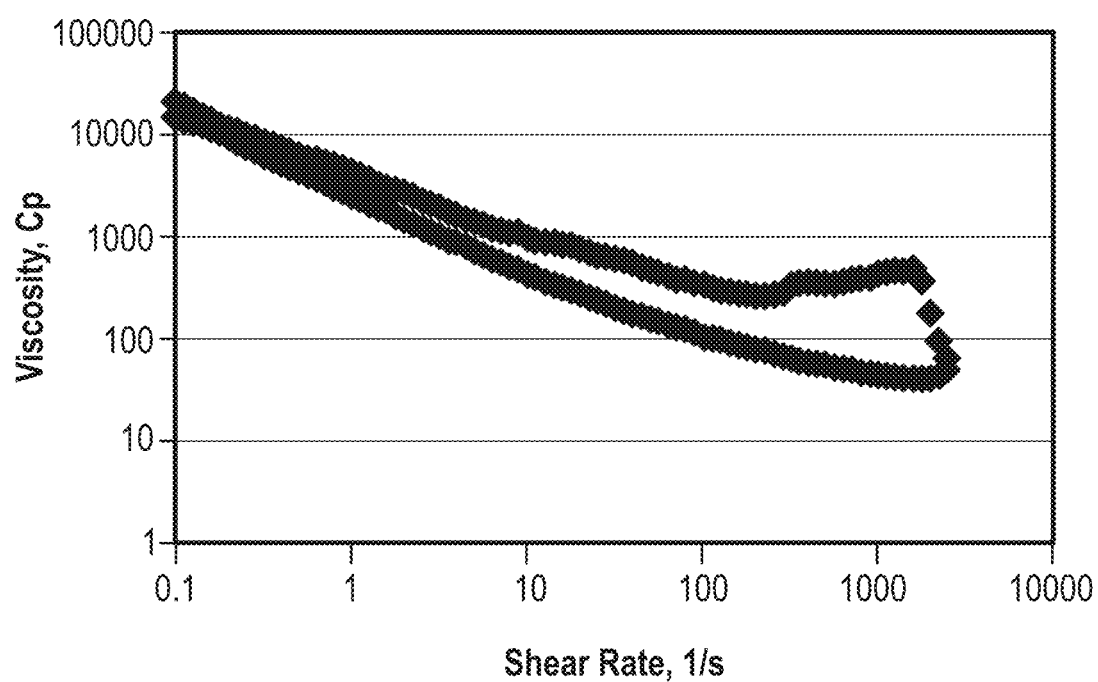
FIG. 3 includes a graph illustrating a viscosity profile of a mixture comprising dispersed solid PTFE particles according to one embodiment.

Preparing a Curable Mixture Comprising PTFE Particles.
A mixture was prepared by combining 76.6 vol % of an aqueous PTFE dispersion (DAIKIN D-610C from Daikin)

with two water soluble binders: 1) 18.4 vol % of an acrylic-difunctional polyethylene glycol (SR344 from Sartomer, Arkema), and 2) 4.6 vol % of a polyester acrylate oligomer (CN2302 from Sartomer, Arkema) and 0.4 vol % of photo-initiator IRGACURE 819 from BASF. The DAIKIN D610C PTFE dispersion contained 30 vol % PTFE particles having an average particle size of 200 nm and 70 vol % of a liquid including water and surfactant. The amount of surfactant in the DAIKIN dispersion was 6 wt % based on the amount of solid PTFE particles. A summary of the components of the mixture based on total weight and volume of the mixture is also shown in Table 1 The mixture had a viscosity at a temperature of 25° C. and at a shear rate in a range of 0.1 $s^{-1}$ to 100 $s^{-1}$ between about 50000 to 100 cP (see FIG. 3).

Example 2

Continuous Forming of a Three-Dimensional Body Comprising PTFE Particles.

The mixture prepared in Example 1 was placed in a chamber of an assembly having a similar design as shown in FIG. 2A and FIG. 2B. As electromagnetic radiation unit was an array of LEDs having a UV wavelength maximum at 405 nm.

A series of flower-bud shaped bodies were formed by varying from experiment to experiment the forming speed (between 1 mm/min and 15 mm/min) and an radiation intensity of 5 mW/cm². Best results could be obtained at a forming speed of 10 mm/min and a radiation intensity of 5 mW/cm².

The formed flower-bud body was dried (removing of the water) at room temperature in an open lab environment for about 12 hours to a stable weight. The body had a weight loss of 28 wt % corresponding to the water evaporation. During drying, the flower-bud body has shrinked by about 15%.

Figure 4:
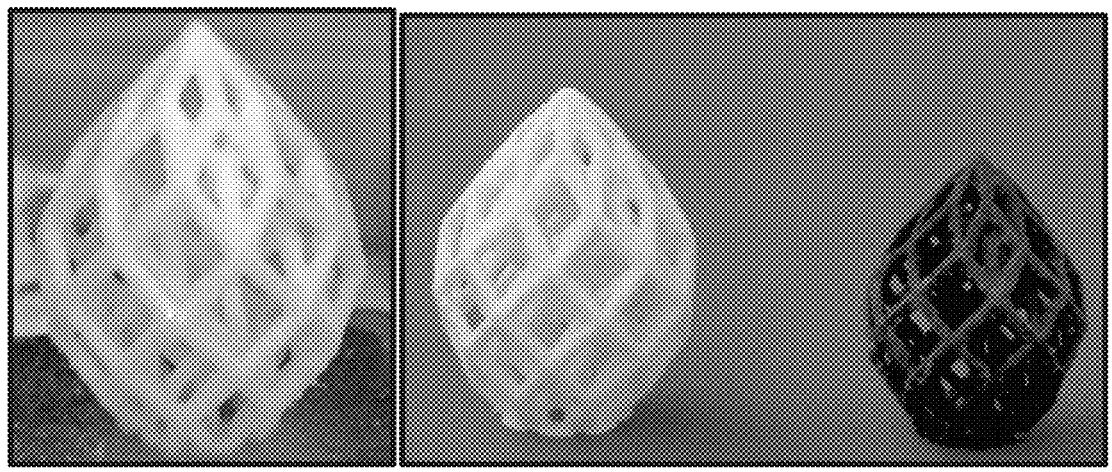
FIG. 4 includes an image illustrating the shrinkage of a formed three-dimensional body after drying and sintering according to one embodiment.

After drying, the body was subjected to a further heat-treatment regime to remove the cured binder and to conduct high temperature sintering. The temperature was increased at a speed of 1° C./min up to a maximum sintering temperature of 380° C. The temperature was maintained for 30 minutes at 380° C., followed by free cooling (uncontrolled free cooling speed of the oven, about 5-10° C./min). After sintering, the shrinkage of the body was about 32% based on the size of the formed bodies before drying and sintering, but the shape of the body was maintained, see also FIG. 4. The weight loss after sintering was 23 wt % based on the total weight of the body after drying, which corresponds to the binder content of about 20 wt % and about 3 wt % leftover water in the dried body.

The material of the sintered PTFE bodies had a density between 2 g/cm³ and 2.1 g/cm³, measured by the Archimedes method, which corresponds to a relative density of 90%-95%, assuming a density of 2.2 g/cm³ for dense non-porous PTFE.

Example 3

Forming of Three-Dimensional Bodies Comprising PTFE Particles in the Presence of a Dye.

A mixture including solid PTFE particles was prepared similar as in Example 1, except that a dye was further added (Rhodamine B) in an amount of 0.05 wt % based on the total weight of the mixture, and only one type of binder (SR 344) was used in an amount of 22.8 vol % based on the total volume of the mixture. The exact composition (S2) can be seen in Tables 1A and 1B below.

Different types of three dimensional bodies were formed from the mixture S2 according to the printing conditions described in Example 2.

Figure 5A:
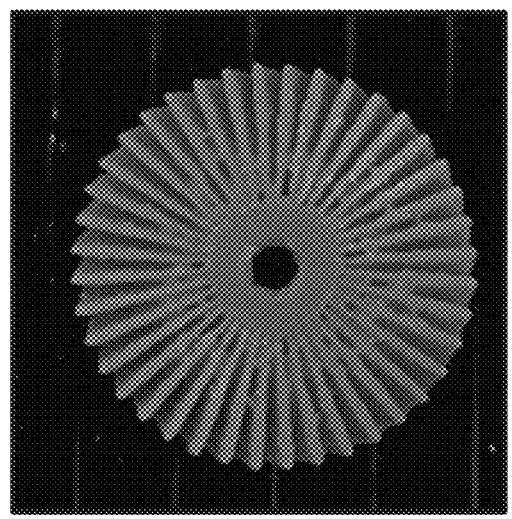
FIGS. 5A, 5B, and 5C include images of formed PTFE comprising bodies before sintering in the presence of a dye according to embodiments.
Figure 5B:
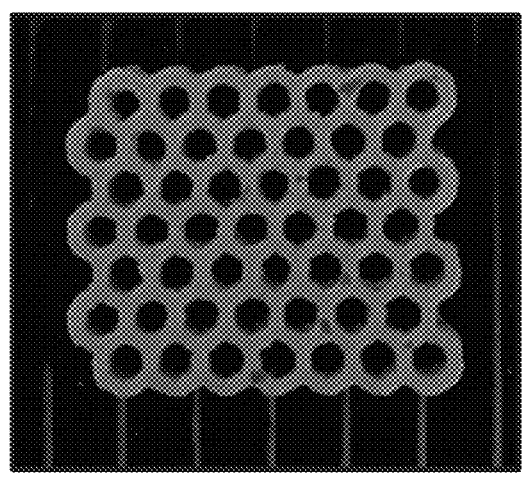
Figure 5C:
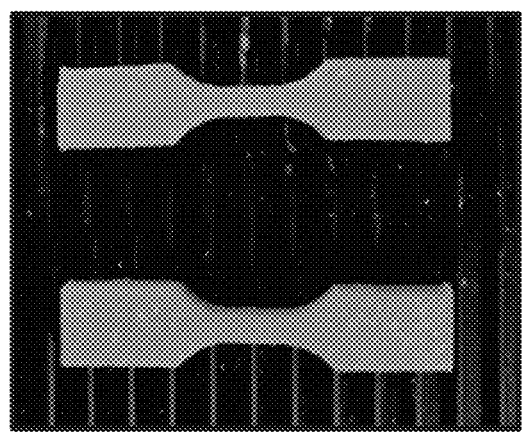

The formed bodies showed an improved resolution compared to the three dimensional bodies of Example 2 (S1), and a variety of shapes after drying and before sintering can be seen in FIGS. 5A, 5B, and 5C.

The bodies were subjected to drying and sintering according to the following heat-treatment regime: 1° C./min up to 120° C.; 2° C./min up to 380° C.; 5 min isothermal heating at 380° C.; and cooling to room temperature at 10° C./min.

Figure 6:
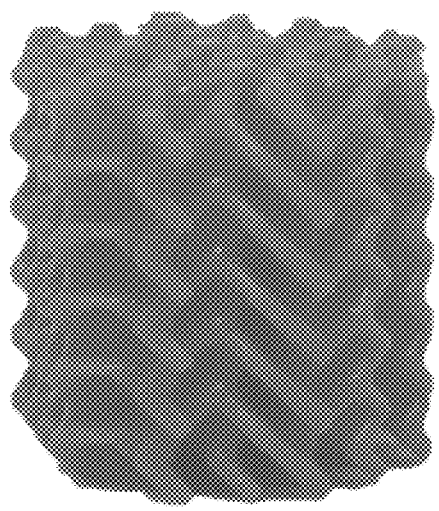
FIG. 6 includes images of formed PTFE comprising body after forming and after drying and sintering according to one embodiment FIG. 7A includes an image of a formed FEP comprising body after drying, which was formed without the presence of a dye.
Figure 6:
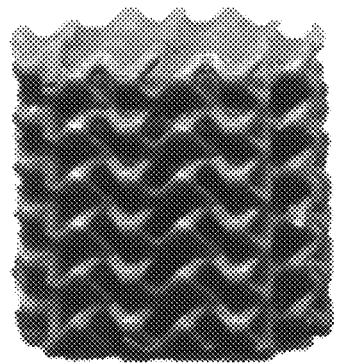

FIG. 6 shows a comparison of a PTFE comprising body printed from mixture S2. The left image shows the body directly after forming and the right image after drying and sintering. The shrinkage rate after sintering was about 30% (in comparison to the size before drying); the sintered PTFE body had a density of 2.0 g/cm3, and a relative density of about 90%.

Example 4

Forming of Three-Dimensional Bodies Comprising PFA or FEP Particles.

A mixture was prepared containing an aqueous dispersion of 200 nm sized PFA particles (Teflon PFAD 335D from Chemours) mixed with water-soluble binder (SR344), a photoinitiator (IRGACURE 819), and a dye (Rhodamine B from Sigma Aldrich). A similar mixture was prepared using an aqueous dispersion of solid FEP particles with an average size of 180 nm (Teflon FEPD 121 from Chemours) instead of the PFA dispersion; the amount of the other ingredients of the mixture was the same. The amounts of each ingredient based on a total amount of the mixtures are shown in Tables 1A and 1B (samples S3 and S4).

TABLE 1A

| Sample | Type of solid polymeric particles | Polymeric particles [vol %] | Water [vol %] | Surfactant [vol %] | Binder [vol %] | Dye [vol %] | Photo-initiator [vol %] |
|---|---|---|---|---|---|---|---|
| S1 | PTFE | 31.11 | 42.89 | 2.74 | 22.81 | 0 | 0.46 |
| S2 | PTFE | 31.09 | 42.86 | 2.74 | 22.80 | 0.07 | 0.46 |
| S3 | FEP | 27.64 | 47.01 | 2.74 | 22.11 | 0.07 | 0.44 |
| S4 | PFA | 31.09 | 42.86 | 2.74 | 22.8 | 0.07 | 0.46 |

TABLE 1B

| Sample | Type of solid polymeric particles | Polymeric particles [wt. %] | Water [wt. %] | Surfactant [wt. %] | Binder [wt. %] | Dye [wt. %] | Photo-initiator [wt. %] |
|---|---|---|---|---|---|---|---|
| S1 | PTFE | 49.83 | 31.23 | 1.99 | 16.61 | 0.00 | 0.33 |
| S2 | PTFE | 49.81 | 31.21 | 1.99 | 16.60 | 0.05 | 0.33 |
| S3 | FEP | 45.66 | 35.30 | 2.05 | 16.60 | 0.05 | 0.33 |
| S4 | PFA | 49.81 | 31.21 | 1.99 | 16.60 | 0.05 | 0.33 |

From the prepared mixtures, three-dimensional bodies were formed according to the method described in Example 2 at a forming speed of 1 mm/min and an applied radiation intensity of 10 mW/cm². It could be observed that the presence of the dye showed a large improvement of the resolution of the formed bodies. FIGS. 7A and 7B illustrate a three-dimensional body comprising FEP formed with mixture S3 after drying. The addition of 0.05 wt % Rhodamine B could cause a remarkable improvement in the resolution of a honeycomb structured body (right image, FIG. 7B) in comparison to the body formed without the presence of the dye (left image, FIG. 7A). Bodies with very good resolution could be also obtained with other complex body structures, such as a flower-bud or a threaded screw.

The following heat-treatment regimes were applied for drying and sintering of the FEP comprising bodies:

A) 2° C./min up to 120° C.; 5° C./min up to a 380° C., isothermal heating for 30 min at 380° C., followed by cooling at a rate of 10° C./min to room temperature.

B) 2° C./min up to 120° C.; 5° C./min up to a 300° C., isothermal heating for 15 min at 300° C., followed by cooling at a rate of 10° C./min to room temperature.

After high temperature sintering according to the heat treatment regime A) of up to 380° C., the bodies partially collapsed.

Figure 8A:
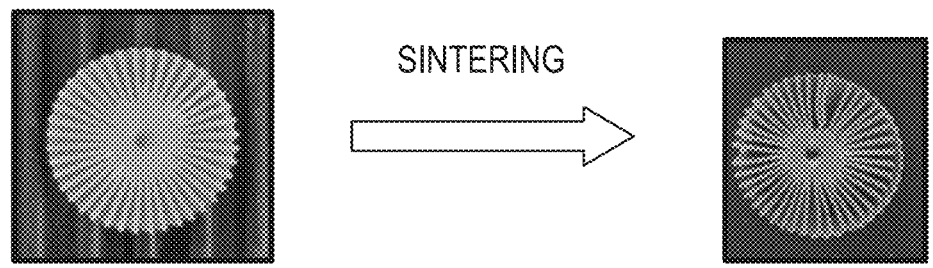
FIGS. 8A, 8B, and 8C include images of formed FEP comprising bodies before and after sintering (300° C.) according to embodiments.
Figure 8B:
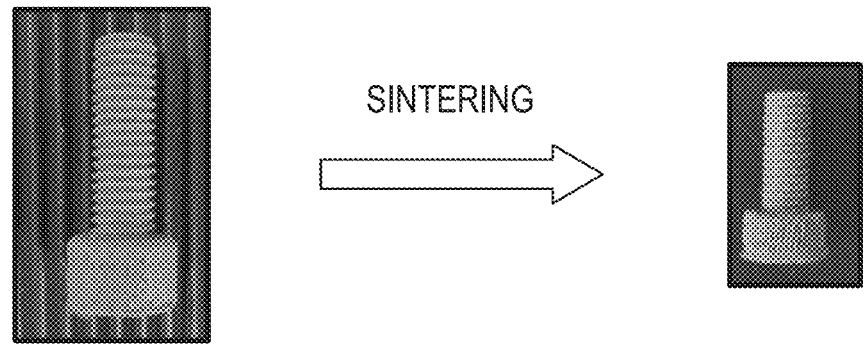
Figure 8C:
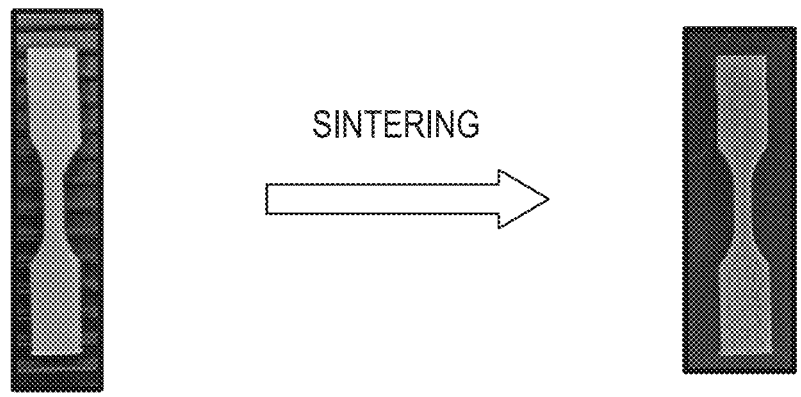

At a lower maximum sintering temperature of 300° C. (heat treatment regime B), the sintered bodies maintained their shape, see FIGS. 8A, 8B, and 8C.

A thermogravimetric analysis (TGA) of a FEP comprising body after drying (i.e., Sample S3, after removal of the water) is illustrated in FIG. 9. It can be seen that after drying, only a very minor amount of water (<3%) stayed in the body. A noticeable decrease in weight started at a temperature of 200° C., which corresponds to the decomposition of the cured binder. A weight loss of about 5 wt % binder based on the total amount of the binder was reached at a temperature of about 210° C., which relates to the decomposition temperature of the binder in accordance with the present disclosure. No remarkable differences in the speed of the weight decrease could be observed until the melting point of the FEP particles (260° C.) and the maximum sintering temperature (380° C.), which indicates that after sintering, a certain amount of binder was still present in the body. A first plateau was reached at a temperature of about 450° C., indicating that at this point, all binder was removed. The following large drop in mass starting at about 525° C. appears to relate to the decomposition of the FEP particles. The density of the material of the FEP-based body after sintering at 380° C. was 2.19 g/cm³. The density was determined by the Archimedes method.

Example 5

Influence of Dye Concentration on Resolution of Printed PTFE Bodies

Mixtures were prepared including solid PTFE particles with varying concentration of Rhodamine B. The mixtures contained 76.6 vol % of an aqueous PTFE dispersion (DAIKIN D-610C from Daikin) having an average particle size of 200 nm, 22 vol % of an acrylic difunctional polyethylene glycol (SR344 from Sartomer, Arkema), 0.11 vol % of a photoinitiator (IRGACURE 819 from BASF) and about 1.4 vol. % of a defoamer. The Rhodamine B concentration was varied at concentrations of 0.025 wt %, 0.075 wt %, 0.1 wt %, and 0.2 wt % based on the total weight of the mixture.

A summary of the tested compositions is shown in Tables 2A and 2B. All concentrations are shown in vol % and wt % based on the total volume or weight of the mixtures.

TABLE 2A

| Sample | Amount of PTFE particles [wt %] | Water [wt %] | Surfactant [wt %] | Binder [wt %] | Rhodamine B [wt %] | Photo-initiator [wt %] | Defoamer [wt %] |
|---|---|---|---|---|---|---|---|
| S5 | 49.8 | 30.2 | 3.0 | 15.89 | 0.025 | 0.08 | 1.0 |
| S6 | 49.8 | 30.2 | 3.0 | 15.84 | 0.075 | 0.08 | 1.0 |
| S7 | 49.8 | 30.2 | 3.0 | 15.82 | 0.100 | 0.08 | 1.0 |
| S8 | 49.8 | 30.2 | 3.0 | 15.72 | 0.200 | 0.08 | 1.0 |

TABLE 2B

| Sample | Amount of PTFE particles [vol %] | Water [vol %] | Surfactant [vol %] | Binder [vol %] | Rhodamine B [vol %] | Photo-initiator [vol %] | Defoamer [vol %] |
|---|---|---|---|---|---|---|---|
| S5 | 31.1 | 41.5 | 4.1 | 21.82 | 0.034 | 0.11 | 1.374 |
| S6 | 31.1 | 41.5 | 4.1 | 21.75 | 0.103 | 0.11 | 1.374 |

TABLE 2B-continued

| Sample | Amount of PTFE particles [vol %] | Water [vol %] | Surfactant [vol %] | Binder [vol %] | Rhodamine B [vol %] | Photo-initiator [vol %] | Defoamer [vol %] |
|---|---|---|---|---|---|---|---|
| S7 | 31.1 | 41.5 | 4.1 | 21.72 | 0.137 | 0.11 | 1.374 |
| S8 | 31.1 | 41.5 | 4.1 | 21.58 | 0.275 | 0.11 | 1.374 |

Figure 11A:
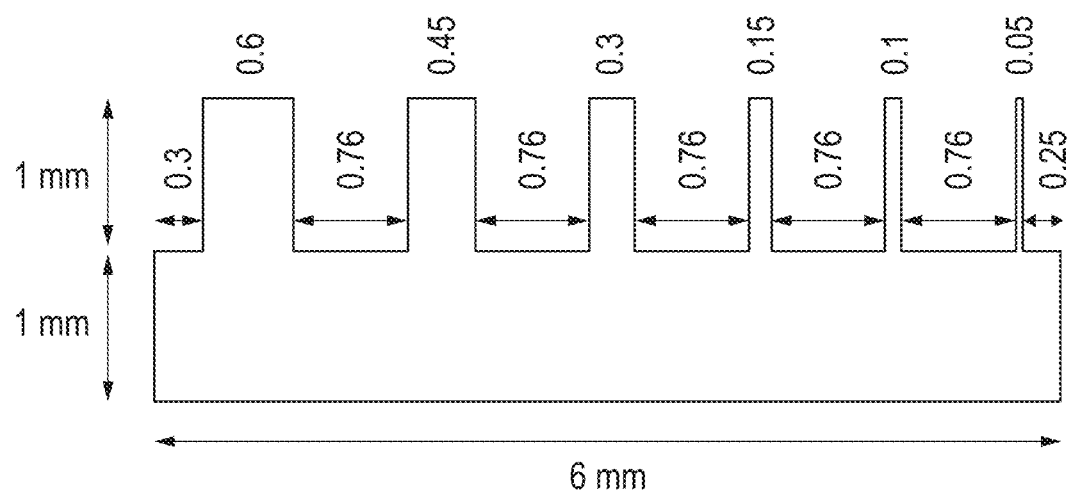
FIG. 11A includes a drawing illustrating a side view of a 3D model for printing.
Figure 11B:
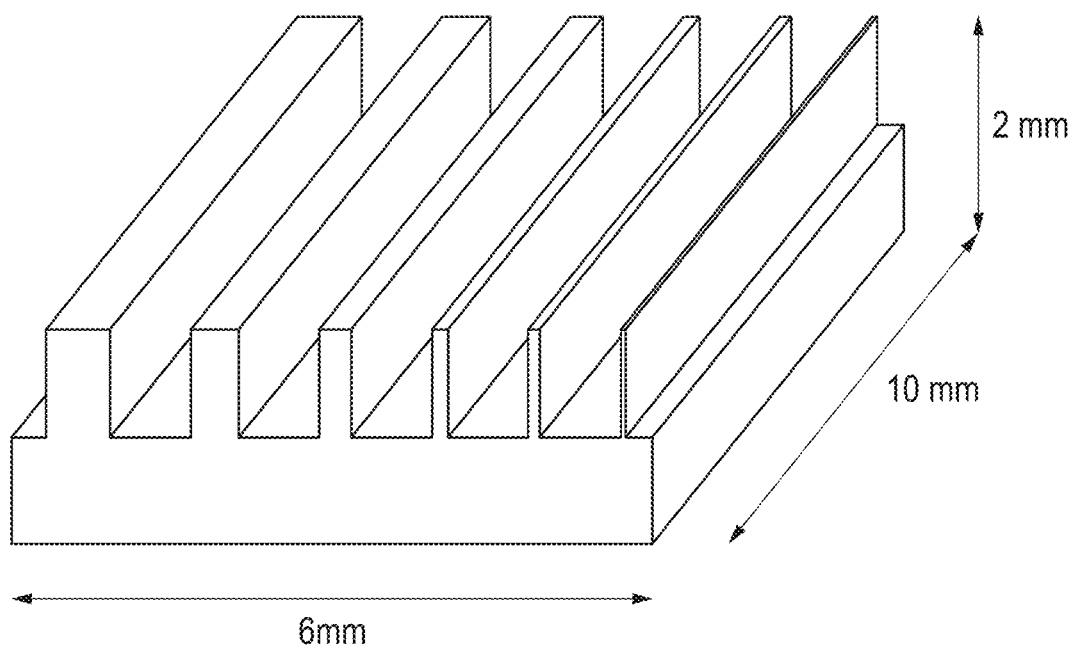
FIG. 11B includes a drawing illustrating a three dimensional view of a 3D model for printing.

From the mixtures listed in Table 2A/2B, defined three dimensional bodies were continuously formed according to the method described in Example 2 at a forming speed of 0.5 mm/min and an applied radiation intensity of 4 mW/cm$^2$. Three-dimensional bodies were formed from mixtures S5-S7 (mixture S8 was not printable under the defined conditions). The form of the printed bodies was based on a specifically designed 3D model to investigate the minimum printable feature size in dependency to the amount of Rhodamine B in the mixture. The 3D model contained six parallel arranged walls of 1 mm height, with varying wall thickness: 50 microns, 100 microns, 150 microns, 300 microns, 450 microns, and 600 microns. A magnified drawing of the 3D model is shown in FIGS. 11A and 11B.

Figure 12A:
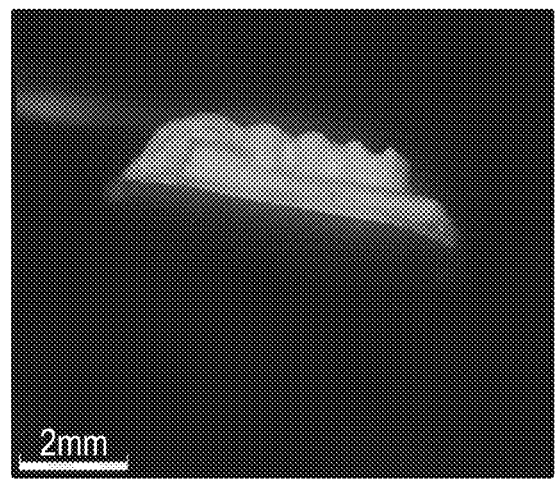
FIGS. 12A, 12B, and 12C include side view images of PTFE comprising bodies after drying, wherein the bodies were formed with varying amounts of Rhodamine B in the mixture according to embodiments.

The difference in the obtained resolution of the formed bodies after drying is illustrated in the comparison of FIGS. 12A; 12B, and 12C, which show images of formed three dimensional dried bodies printed from mixtures including 0.025 wt %, 0.075 wt %, and 0.1 wt % Rhodamine B respectively. Drying was conducted at 40° C. until a stable weight was obtained. It can be seen that at 0.025 wt % (FIG. 12A) and at 0.1 wt % (FIG. 12C) Rhodamine B, the resolution of the formed bodies was not sharp and each wall showed large irregularities and no clear gap between the walls could be formed. At 0.075 wt % Rhodamine B concentration (FIG. 12B), the printed three dimensional body included three of the six walls of the 3D model, missing only the thinnest walls with a thickness of 50 microns, 100 microns and 150 microns.

Figure 12B:
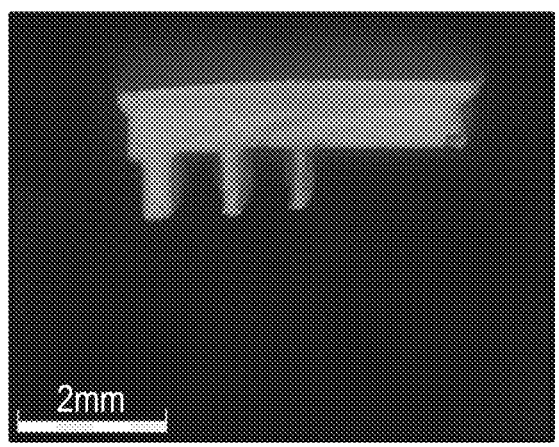
Figure 12C:
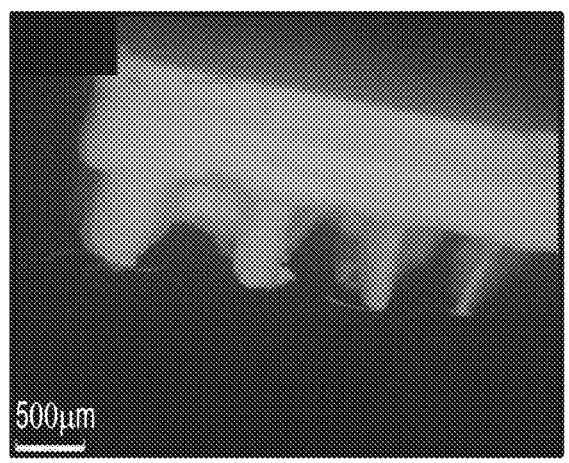
Figure 13A:
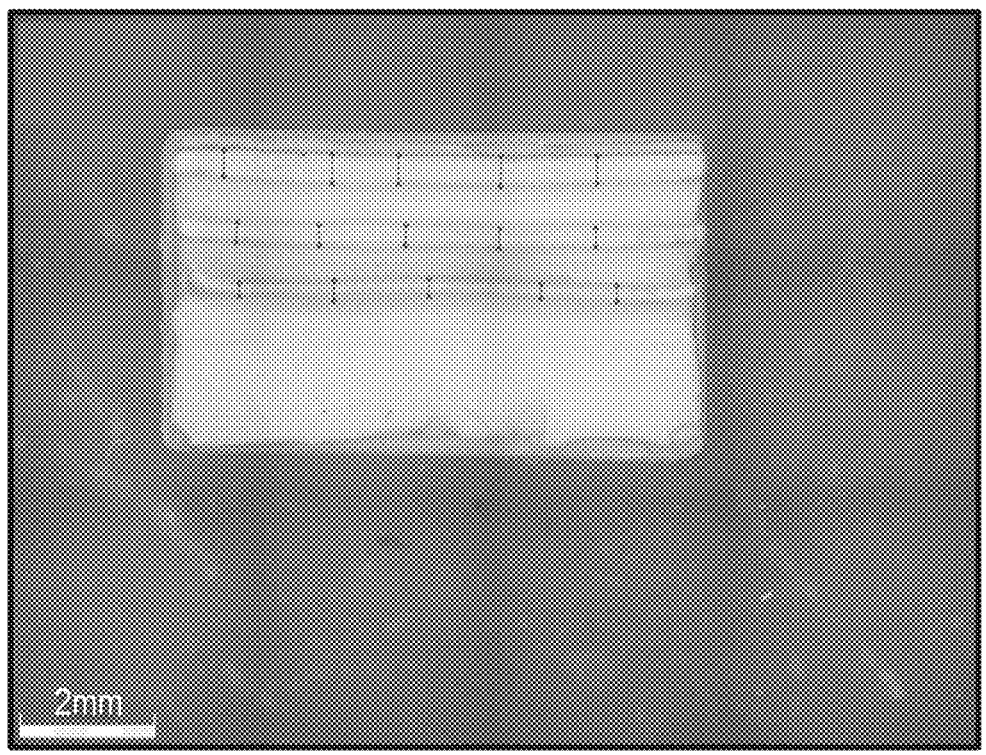
FIG. 13A includes a top view of an image of a PTFE comprising body after drying (also shown as side view in FIG. 12B) with markings of positions of thickness measurements of the formed walls according to one embodiment.
Figure 13B:
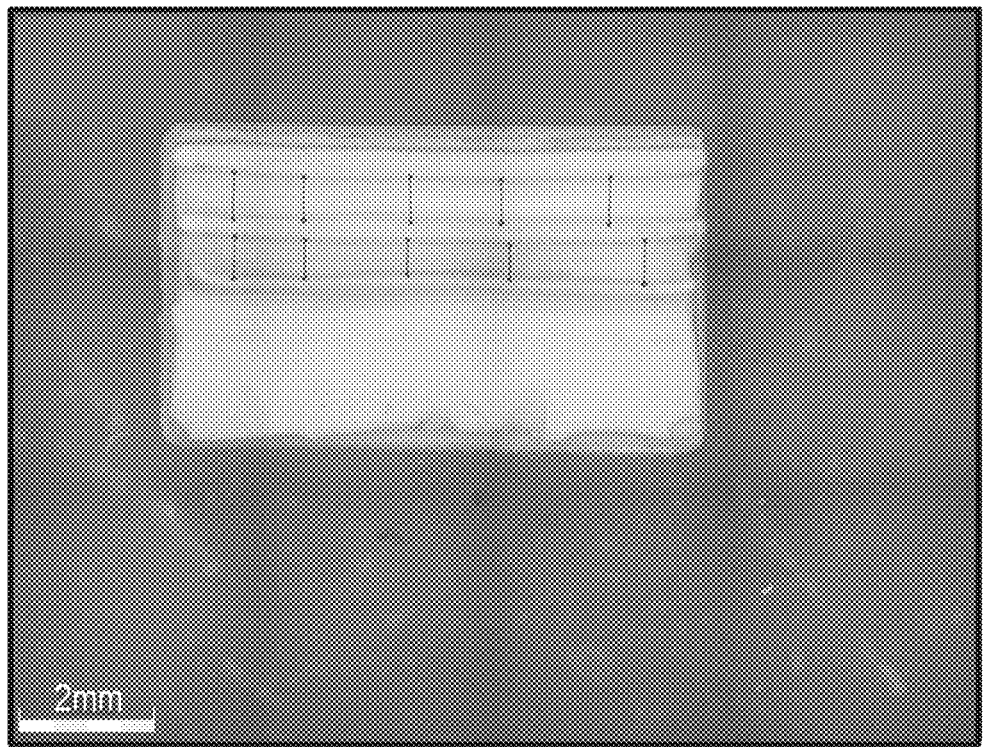
FIG. 13B includes a top view of an image of a PTFE comprising body after drying (also shown as side view in FIG. 12B) with markings of positions of gap size measurements between the walls according to one embodiment.

FIGS. 13A and 13B show top view images of the PTFE body shown as side view in FIG. 12B, formed with 0.075 wt % Rhodamine B. It can be seen that the walls do not connect with each other. In FIG. 13A, the thickness of each of the formed walls was measured at five different locations and compared with the wall thickness of the corresponding model. In FIG. 13B, the gap size between two adjacently formed walls at five different positions was measured and an average value calculated. A summary of the measured data is shown in Tables 3 and 4.

The thinnest isolated wall structure which could be formed had a thickness of 246 microns±39 microns. The resolution data indicate that by carefully selecting the concentration of Rhodamine B in the printing mixture, fine structure units having a size resolution of not greater than 250 microns can be formed in a dried body. As used herein, the term size resolution of not greater than 250 microns relates to the printing of an isolated structure unit having a height of at least 1 mm and a thickness of not greater than 250 microns after drying.

The average gap size (average value of measured gap size at five different positions and standard deviation) was 671 microns±27 microns between the largest and medium thick walls, while the gap between the medium and smallest formed wall was 585 microns±60 microns.

While the distance (gap) between the walls is in good agreement with the predicted drying shrinkage of 15%, the formed wall thicknesses were lower than what is estimated from a 15% shrinkage. This can be related to the fact fine features (like a thin wall) may require more UV exposure during printing than larger features to be fully formed. This effect can be corrected by either adding more radiation intensity when forming fine features or by over scaling in order to compensate and achieve a desired feature size.

TABLE 3

| Model wall sizes [μm] | Model wall size assuming 15% drying shrinkage [μm] | Average wall sizes of dried green body [μm] | Wall thickness variation in dried green body [±μm] | Average wall sizes after sintering [μm] | Wall thickness variation after sintering [±μm] |
|---|---|---|---|---|---|
| 50 | 41 | not formed | | | |
| 100 | 82 | not formed | | | |
| 150 | 123 | not formed | | | |
| 300 | 246 | 246 | 39 | 190 | 22 |
| 450 | 368 | 300 | 7 | 244 | 9 |
| 600 | 491 | 430 | 22 | 359 | 23 |

TABLE 4

| Model: Gaps between walls [μm] | Model: Gaps between walls assuming 15% drying shrinkage [μm] | Average Distance between walls in dried green body [μm] | Gap variation between walls in dried green body [±μm] | Average Distance between walls after sintering [μm] | Gap variation between walls after sintering [±μm] |
|---|---|---|---|---|---|
| 760 | 654 | 671 | 27 | 577 | 21 |
| 760 | 654 | 585 | 60 | 496 | 25 |

The three dimensional body formed with a concentration of 0.075 wt % Rhodamine B was further subjected to high temperature sintering of the following heat treatment regime: 1° C./min up to 120° C.; 2° C./min up to 380° C.; 5 min isothermal heating at 380° C.; and cooling to room temperature at 10° C./min.

Figure 14A:
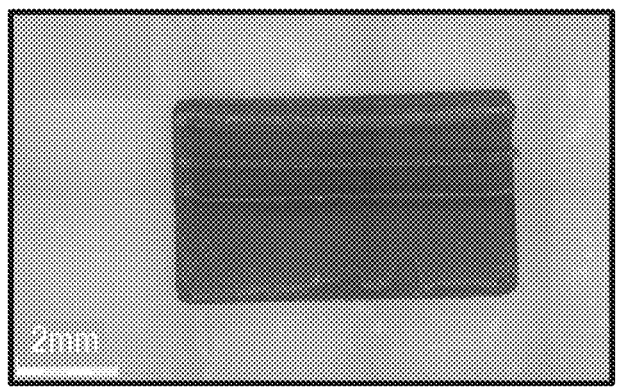
FIG. 14A includes a top view of an image of a sintered PTFE comprising body according to one embodiment.
Figure 14B:
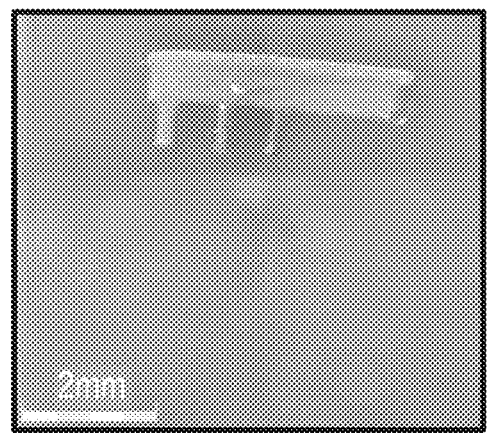
FIG. 14 B includes a side view of an image of a sintered PTFE comprising body according to one embodiment.
FIG. 14C includes a top view of an image of a sintered PTFE comprising body with markings of positions of thickness measurements of the walls according to one embodiment.
FIG. 14D includes a top view of an image of a sintered PTFE comprising body with markings of positions of gap size measurements between the walls according to one embodiment.
Figure 14C:
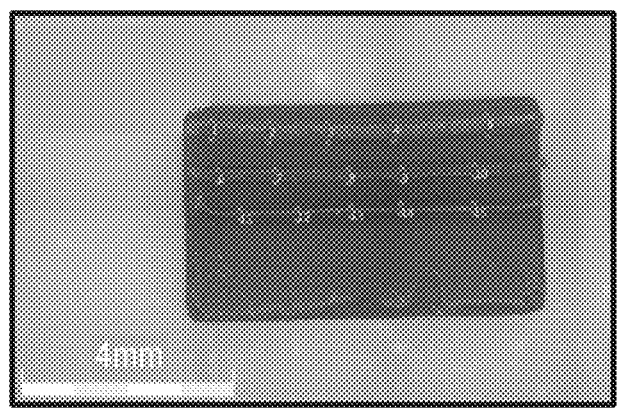
Figure 14D:
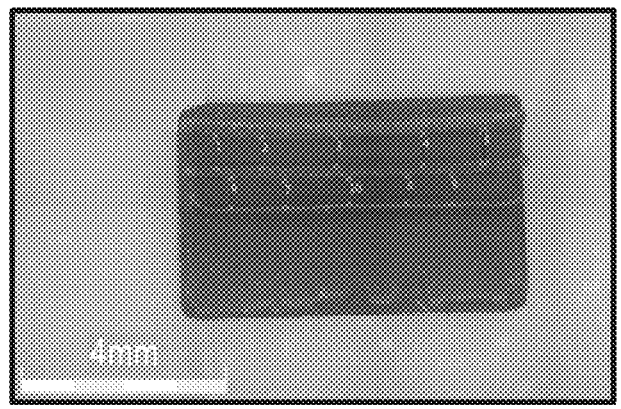

Images of the three dimensional body after sintering are shown in FIGS. 14A, 14B, 14C, and 14D. It can be seen that the three walls of the body (resolution lines) survived the sintering process. FIG. 14C illustrates the positions of measuring the wall thickness after sintering. FIG. 14D shows the positions of measuring the distance between the walls, which are called herein also gaps.

The data demonstrate that it is possible by carefully selecting the concentration of Rhodamine B in the printing mixture to form fine thin structure units at a size resolution of not greater than 190 microns in the sintered PTFE bodies.

Example 6

Mechanical Properties of Continuously Formed Sintered PTFE Bodies.

Figure 15:
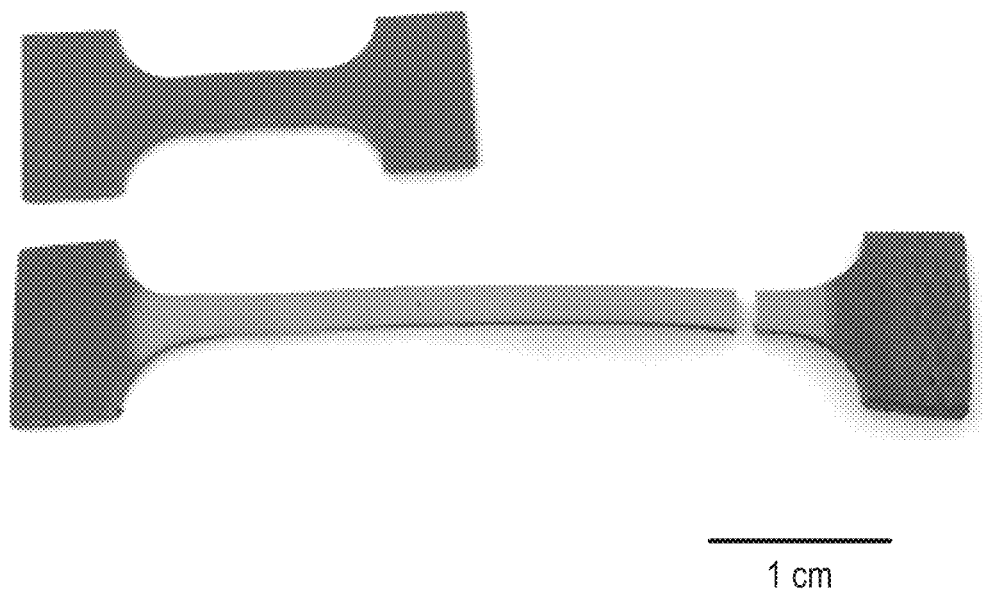
FIG. 15 includes images of a sintered PTFE comprising body before and after mechanical testing of the elongation at break according to one embodiment.

Rectangular PTFE rods were continuously formed from mixtures as described in Example 5, using 0.05 wt % Rhodamine B and as PTFE dispersion Daikin 210C, containing PTFE particles with an average particle size of 220-250 nm. After continuous forming and drying the PTFE comprising bodies, the dried bodies were high temperature sintered according to the temperature regime described in Example 3. The rectangular rods were tested in x-y direction for tensile strength at maximal load and elongation at break according to modified ASTM 4894. As used herein, modified ASTM 4894 means that the shape of the tested body was different. The rectangular shape of the sintered PTFE body to be tested had a length of 18 mm, a width of 3.95 mm, and a thickness of 1.46 mm. Each test was repeated six times and an average value calculated with error estimated as three times the standard deviation divided by the square root of the numbers of tests. A summary of the test results is shown in Table 5. An illustration of a tested PTFE body before and after strain break is shown in FIG. 15.

TABLE 5

| Property | Average Value |
|---|---|
| Tensile Strength at maximum load [MPa] | 18.8 ± 2.0 |
| Elongation at break [%] | 188 ± 53 |

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A method of forming a three-dimensional body, comprising:
   providing a liquid mixture comprising a curable binder and dispersed solid fluoropolymeric particles; and
   forming a three-dimensional body from the liquid mixture by curing the binder to form a cured binder, wherein forming includes translation and growth of the three-dimensional body from an interface of the liquid mixture.

2. The method of claim 1, wherein forming of the body is conducted continuously.

3. The method of claim 1, further comprising
   removing at least a portion of the cured binder from the formed three-dimensional body by a chemical treatment or a thermal treatment; followed by sintering to obtain a sintered three-dimensional body.

4. The method of claim 3, wherein sintering is conducted at a sintering temperature not less than 50° C. below a thermal transition temperature of the solid fluoropolymeric particles.

5. The method of claim 4, wherein sintering is conducted at a sintering temperature not less than 10° C. below a decomposition temperature of the solid fluoropolymeric particles.

6. The method of claim 3, wherein the sintered three-dimensional body has a tensile strength at maximum load of at least 12 MPa.

7. The method of claim 3, wherein the sintered three-dimensional body has an elongation of break of at least 100% at a temperature of 25° C.

8. The method of claim 1, wherein the liquid mixture further includes a dye.

9. The method of claim 8, wherein the dye is selected from a rhodamine dye, a fluorone dye, a cyanine dye, an acridine dye, a cyanine dye, a phenanthridine dye, an oxazine dye, or any combination thereof.

10. The method of claim 9, wherein the rhodamine dye includes Rhodamine B.

11. The method of claim 8, wherein an amount of the dye is at least 0.01 wt % and not greater than 0.5 wt % based on the total weight of the liquid mixture.

12. The method of claim 8, wherein the dye is Rhodamine B and present in an amount of at least 0.02 wt % to not greater than 0.1 wt % based on a total weight of the liquid mixture.

13. The method of claim 1, wherein an amount of the solid fluoropolymeric particles in the liquid mixture is at least 15 vol % and not greater than 70 vol % based on a total volume of the liquid mixture.

14. The method of claim 1, wherein the solid fluoroploymeric particles have an average primary particle size of at least 80 nm.

15. The method of claim 1, wherein the solid fluoroploymeric particles include polytetrafluoroethylene (PTFE), tetrafluoroethylene-hexafluoropropylene (FEP), perfluoroalkoxyethylene (PFA), ethylene-tetrafluoroethylene (ETFE), polyvinylidone fluoride (PVDF), ethylene-chlorotrifluoroethylene (ECTFE), perfluoromethyl vinyl ether (MFA), or any combination thereof.

16. The method of claim 15, wherein the solid fluoroploymeric particles consist essentially of PTFE.

17. The method of claim 15, wherein the solid fluoroploymeric particles include polytetrafluoroethylene (PTFE), tetrafluoroethylene-hexafluoropropylene (FEP), perfluoroalkoxyethylene (PFA), or any combination thereof.

18. The method of claim 1, wherein an amount of the solvent in the liquid mixture is at least 10 wt % based on a total weight of the liquid mixture.

19. The method of claim 1, wherein the curable binder includes polymerizable monomers or polymerizable oligomers, the polymerizable monomers or polymerizable oligomers including an acrylate, an acrylamide, a urethane, a diene, a sorbate, a sorbide, a carboxylic acid esters, or any combination thereof.

20. The method of claim 1, wherein forming is conducted at a forming speed of at least 10 mm/hour.

21. The method of claim 1, wherein the fluoropolymeric particles do not dissolve in the liquid mixture.

22. A method of forming a three-dimensional body, comprising:
   providing a liquid mixture comprising a curable binder and dispersed solid polymeric particles; and
   forming a three-dimensional body from the liquid mixture by curing the binder to form a cured binder, wherein forming includes translation and growth of the three-dimensional body from an interface of the liquid mixture, and the solid polymeric particles have a higher thermal transition temperature than a decomposition temperature of the cured binder.

* * * * *